(12) United States Patent
Adams et al.

(10) Patent No.: US 11,329,728 B1
(45) Date of Patent: May 10, 2022

(54) OPTICAL TRACKING SYSTEM USING POLARIZATION MODULATION

(71) Applicant: AMAZON TECHNOLOGIES, INC., Seattle, WA (US)

(72) Inventors: Jeff Clark Adams, Seattle, WA (US); Donald Mitchell Cornwell, Bellevue, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 17/242,884

(22) Filed: Apr. 28, 2021

(51) Int. Cl.
| | |
|---|---|
| *H04B 10/532* | (2013.01) |
| *H04B 10/69* | (2013.01) |
| *H04B 10/118* | (2013.01) |
| *H04B 10/50* | (2013.01) |
| *G02B 27/28* | (2006.01) |

(52) U.S. Cl.
CPC ......... *H04B 10/532* (2013.01); *G02B 27/283* (2013.01); *H04B 10/118* (2013.01); *H04B 10/503* (2013.01); *H04B 10/697* (2013.01)

(58) Field of Classification Search
CPC ...... H04B 10/112–1129; H04B 10/118; H04B 10/532; H04B 10/075–0799; H04B 10/60–6973
See application file for complete search history.

(56) References Cited

U.S. PATENT DOCUMENTS

| | | | |
|---|---|---|---|
| 10,469,177 B1* | 11/2019 | Ulander | H04B 10/532 |
| 2004/0042798 A1* | 3/2004 | Kehr | H04B 10/43 398/135 |
| 2013/0182620 A1* | 7/2013 | Chaffee | H04B 10/503 370/310 |
| 2016/0373188 A1* | 12/2016 | Lambert | H04Q 11/0066 |

OTHER PUBLICATIONS

Peatross, et al., "Physics of Light and Optics—Chapter 6 Polarization of Light", PhysLAB, 26 pgs. Retrieved from the Internet: URL: https://www.physlab.org/wp-content/uploads/2016/07/Ch6-BYUOpticsBook_2013.pdf.
(Continued)

*Primary Examiner* — Nathan M Cors
(74) *Attorney, Agent, or Firm* — Lindauer Law, PLLC

(57) ABSTRACT

Light is modulated at a source to encode data. An additional tracking signal is imposed on the light using polarization modulation (PM). PM modulates one or more values of polarization rotation or polarization ellipticity of the light. These values may be dithered within constraints to provide a specified modulation index at the optical receiver, without impairing the encoded data. At the optical receiver, a polarization analyzer is used to recover the tracking signal, converting the polarization modulation to amplitude modulation. For example, after the light passes through the analyzer, an array of optical photodetectors detects the changes in apparent intensity resulting in the interaction between the light and the analyzer that correspond to the tracking signal. Due to a high modulation index, the recov- (Continued)

ered signal exhibits a high signal to noise ratio (SNR). The high SNR improves a noise equivalent angle, improving tracking performance.

20 Claims, 12 Drawing Sheets

(56) References Cited

OTHER PUBLICATIONS

"Introduction to Polarization", Edmund Optics Worldwide, 5 pgs. Retrieved from the Internet: URL: https://www.edmundoptics.com/knowledge-center/application-notes/optics/introduction-to-polarization/.
"Optical High Data Rate (HDR) Communication—1064NM", Experimental Specification CCSDS 141.11-01, Research and Development for Space Data System Standards, The Consultative Committee for Space Data Systems, Dec. 2018, 57 pg. Retrieved from the Internet: URL: https://public.ccsds.org/Pubs/141x11o1e2.pdf.
Bindushree, et al., "Design And Simulation Of QPSK Modulator For Optic Inter Satellite Communication", International Journal of Scientific & Technology Research, vol. 3, Issue 8, Aug. 2014, 7 pgs. Retrieved from the Internet: URL: https://www.ijstr.org/final-print/aug2014/Design-And-Simulation-Of-Qpsk-Modulator-For-Optic-Inter-Satellite-Communication.pdf.
Manur, et al., "Polarization Modulation for Communication", International Conference on Information Engineering, Management and Security, vol. 1, 2015, 4 pgs. Retrieved from the Internet: URL: https://edlib.net/2015/iciems/ICIEMS201534.pdf.

\* cited by examiner

OPTICAL TRACKING SYSTEM USING POLARIZATION MODULATION

BACKGROUND

Wireless transmission of data provides many benefits. Wireless transmission using optical wavelengths such as infrared, visible light, and so forth, facilitates high data rates and dense networks with reuse of those wavelengths.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
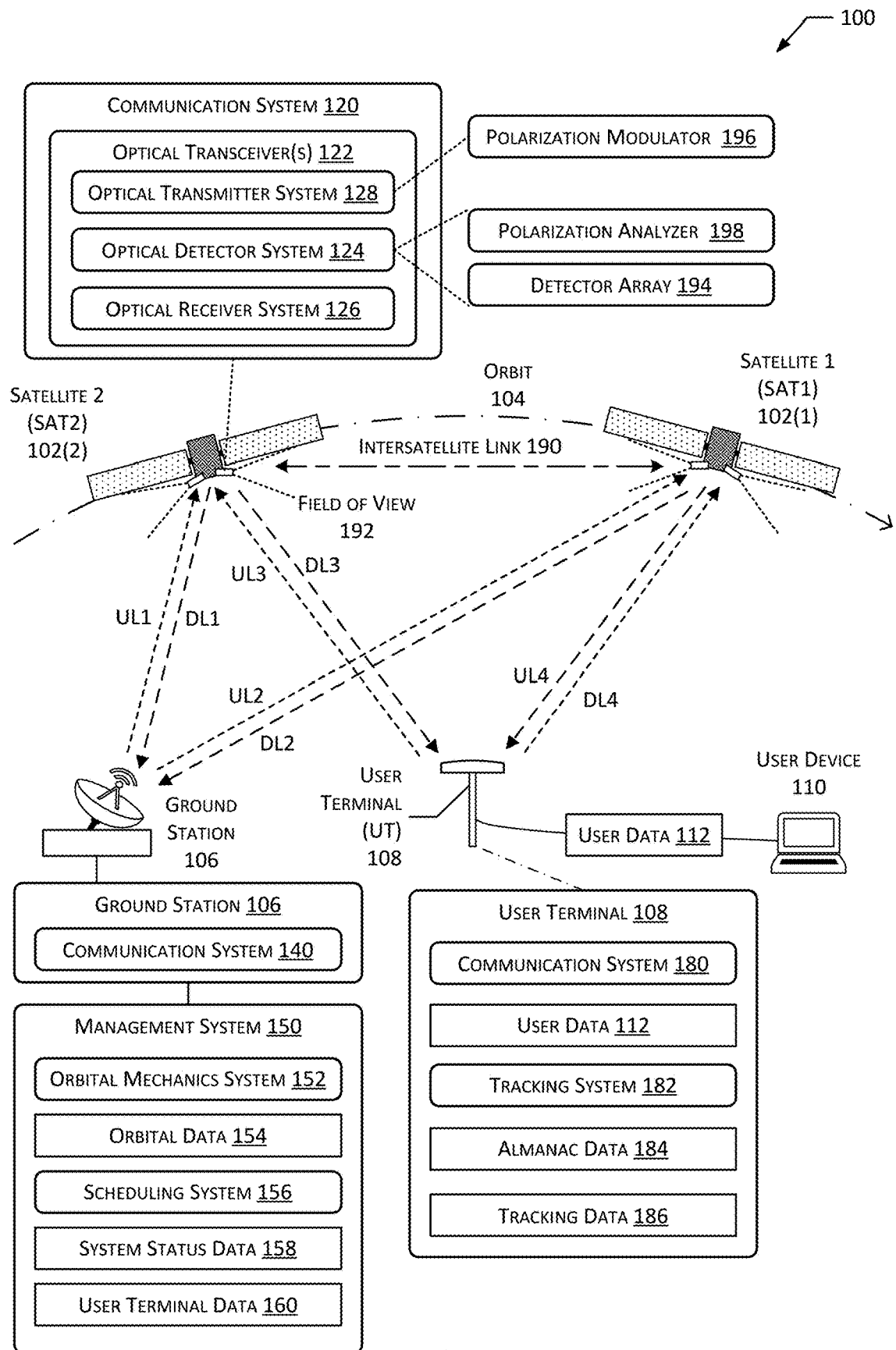
FIG. 1 illustrates a system using ground stations and a constellation of satellites, each with an optical transceiver that uses polarization modulated to convey a tracking signal to facilitate operation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

The ability to transmit data wirelessly provides tremendous utility. Wireless transmission uses one or more frequencies of electromagnetic signals, such as optical wavelengths, to send information. Optical wavelengths may include, but are not limited to, infrared wavelengths, visible light wavelengths, ultraviolet wavelengths, and so forth. An optical transceiver comprises a transmitter to send and a receiver to receive signals at optical wavelengths.

Optical wavelengths provide several benefits for data transfer. For example, the high frequencies of optical wavelengths allow high bit rates. Signals at optical wavelengths may be easier to direct in relatively small form factor devices. For example, a telescope may have less volume than a radio-frequency antenna with equivalent gain. Optical wavelengths provide other advantages as well. For example, the same wavelengths may be readily reused simultaneously for communication between different devices, electromagnetic interference from nearby devices may be eliminated, and so forth.

Optical wavelengths may move from one location to another in free space or within a waveguide. Free space may include atmosphere, vacuum, and so forth. In comparison, a waveguide such as an optical fiber may comprise a material such as glass or plastic with an index of refraction such that light at one or more optical wavelengths is propagated within.

A free space optical communication system may be used in a variety of different situations. For example, optical transceivers may be used to provide an intersatellite link between a first satellite and a second satellite, allowing data to be sent from the first satellite to another. In another example, a ground station may communicate with a satellite using an optical transceiver. In still another example, fixed terrestrial stations may communicate with one another using optical transceivers.

As with any system using electromagnetic signals, including optical wavelengths, the received signal must be received with a sufficient signal to noise ratio (SNR) to facilitate the desired communication. As the bit rates increase, the SNR requirements increase as well. By analogy, a person speaking rapidly is more easily understood in a quiet room than in a noisy hall.

To maintain a SNR that allows usable communication over a free space optical communication system, various techniques may be used. At the transmitter, one or more of the transmit power or gain may be increased. An example of increasing the transmit power may involve increasing the brightness of an omnidirectional light source. An example of increasing the gain may be to use reflectors and lenses to direct the light towards a receiver, or to use a directional light source such as a laser that produces a tightly collimated beam of light that is directed towards the receiver.

To provide a needed SNR, at the receiver a more sensitive detector may be used, or gain may be increased. For example, gain may be increased by using a telescope to acquire incoming light obtained from a relatively large lens and focus that light down to a relatively small detector.

Continuing the example, incoming light from the telescope may be coupled to a single mode optical fiber for delivery to a detector.

To maintain communication, it is necessary for the transmitter and the receiver to be pointed at one another and maintain that pointing. The transmitter is positioned so that the light from the transmitter is directed towards the receiver. Likewise, the receiver is positioned so that the light from the transmitter is received. For example, the light source that is transmitting needs to radiate light in the direction of the receiver, and the receiver needs to gather that light and process it with a detector.

During operation of a free space optical communication system, it may be necessary to keep the beam from the transmitter precisely pointed towards the receiver, and likewise keep the receiver precisely pointed towards the transmitter. For example, the beam of incoming light may need to remain on the optical fiber that directs that light to the detector in the receiver. The characteristics that make optical wavelengths useful for data transfer also introduce engineering complications. In particular, the narrowness of the beam of incoming light requires careful pointing of the receiving system to keep that incoming light on the detector of the receiver.

In the ideal situation in which the transmitter and the receiver are not in motion and neither is subject to any sort of vibration, careful pointing could be done once and never repeated. However, all structures have some mechanical motion or vibration. A tower may sway in the wind, temperature changes cause materials to contract or expand, a motor elsewhere in the device causes some vibration during operation, and so forth. These motions can result in a failure of the receiver to remain properly pointed at the transmitter. Likewise, these motions can result in failure of the beam from the transmitter to remain properly pointed at the receiver. A device that is in motion and using optical communication, such as a satellite in orbit, introduces further complications.

To account for these motions, some form of active adjustment or feedback may be used. While the following descriptions are given with respect to an optical receiver, similar systems and techniques may be used with an optical transmitter.

The active adjustment may include an optical detector system that provides output about how far a beam of incoming light deviates from a specified reference. The output signal(s) from the optical detector system may then be used to operate actuators affixed to a moveable mirror or other optical element. A feedback loop attempts to keep the incoming light aligned to a particular predetermined point, such as an optical fiber or center of a detector array, by using the output to operate the actuators. For example, the detector array may comprise four photodetectors arranged into a two-by-two detector array, also known as a "quad cell". As light impinges on each of the photodetectors, an output signal is generated by the individual photodetector. The photodetectors allow for high sensitivity and high sample acquisition rates during operation.

This process of active adjustment may be generally referred to as "tracking". Various factors can complicate the tracking process. For example, light from other sources such as reflected sunlight, starlight, and so forth may be collected by the telescope and provided to the optical detector system. The beam of incoming light is also likely to exhibit some variation in intensity due to modulation at the optical transmitter, gasses or other material along the path travelled by the beam, and so forth. As mentioned above, the tracking process may be ongoing, due to ongoing motions of one or more of the optical transmitter or the optical receiver. For example, two satellites in low Earth orbit (LEO) are constantly in motion, requiring continuous adjustment to maintain optical communication between the two.

A tracking signal may be imposed on the light at the optical transmitter. This tracking signal allows the optical receiver to avoid tracking other light sources by accident. Additionally, the tracking signal provides a known signal for electronics in the tracking system to detect and use to operate the actuators to move the moveable mirror or other optical element. Improvements to an optical signal to noise ratio (SNR) of the tracking signal at the detector array results in improved noise equivalent angle (NEA). The NEA is representative of a pointing error present in an optical detector system. For example, an NEA of 1 microradians indicates that the system exhibits a pointing error of 1 microradian at any given instant. The NEA may be determined based on the optical SNR. As SNR increases, the NEA decreases. The more precisely the beam of incoming light needs to be aligned to the detector of the receiver, the lower the NEA needs to be for the system to function.

Traditionally, a tracking signal would be imposed on the light at the optical transmitter using amplitude modulation (AM). A modulation index may be used to specify how much the amplitude of the modulated signal varies relative to a baseline carrier. The AM modulation with a traditional tracking signal may be visualized as making changes over time to the brightness of the light at the optical transmitter to convey the tracking signal. However, as mentioned above, the tracking is ongoing and so the optical transmitter is sending data while also providing the tracking signal. To avoid having the tracking signal interfere with the data that is also being sent, the modulation index may be limited to a relatively low value, such as 0.15. For example, the 0.15 modulation index results in an approximate 1.2 decibel (dB) decrease in signal amplitude, reducing link budget.

At the receiver, the beam of incoming light is split with a first portion being sent to the optical detector system to facilitate ongoing tracking while a second portion is sent to an optical receiver system to recover the data. In the traditional system, to maintain a needed optical SNR at the optical detector system given the 0.15 modulation index, the first portion may be 25% of the beam of incoming light being directed towards the optical detector system and 75% to the optical receiver system. For the tracking signal, this produces a relative loss of 8.2 dB compared to a 1.0 modulation index. However, as mentioned above, the modulation index of the tracking signal is limited to avoid interfering with the data also being transmitted. A reduction in this loss would result in an increased optical SNR, resulting in a decreased NEA, and improving the precision of the tracking system.

Described in this disclosure are techniques to convey a tracking signal by using polarization modulation (PM). The PM modulates one or more polarization parameters of the light being sent to a receiving system. These polarization parameters are constrained to avoid introducing an ambiguous state at the receiving system. The frequency of the tracking signal is kept relatively low, such that the changes to the polarization parameters do not interfere with transmission of data. The polarization parameters may include one or more of polarization ellipticity or polarization rotation. The tracking signal may be a continuous sinusoidal waveform that does not convey other information. The polarization parameters may be dithered within the constraints, avoiding the need for tight control over the polarization parameters.

At the receiving system, an analyzer or polarizing filter, is used to convert the PM into amplitude modulation (AM). For example, where the polarization of the incoming light is parallel to the polarization of the polarizing filter, the amplitude of the light on the detector array of the optical detector system is at a maximum. Continuing the example, where the polarization of the incoming light is perpendicular to the polarization of the polarizing filter, the amplitude of the light on the detector array is at a minimum. As a result, the modulation index of the AM signal may be up to 1.0, a significant improvement over the 0.15 modulation index of the traditional systems. As a result, the SNR is improved by approximately 8.2 dB in this example, resulting in a substantial decrease in the NEA.

The system may be used in a variety of applications including, but not limited to intersatellite communications, communications between a satellite and ground station, communications between a satellite and user terminals, between vehicles, between terrestrial stations, and so forth. For example, the system may be used in terrestrial applications, mobile applications, and so forth.

Illustrative System

The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals with various wavelengths, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light will spread out at progressively larger distances.

As height above ground increases, the area on the ground that is visible from that elevated point increases. For example, the higher you go in a building or on a mountain, the farther you can see. The same is true for the electromagnetic signals used to provide communication service. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because of the period that the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication service also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation") of satellites 102(1), 102(2), . . . , 102(S), each satellite 102 being in orbit 104. Also shown is a ground station 106, user terminal (UT) 108, and a user device 110.

The constellation may comprise hundreds or thousands of satellites 102, in various orbits 104. For example, one or more of these satellites 102 may be in non-geosynchronous orbits (NGOs) in which they are in constant motion with respect to the Earth. For example, the orbit 104 is a low Earth orbit (LEO). In this illustration, the orbit 104 is depicted with an arc pointed to the right. A first satellite (SAT1) 102(1) is leading (ahead of) a second satellite (SAT2) 102(2) in the orbit 104.

The satellite 102 comprises a communication system 120. The communication system 120 may include one or more optical transceivers 122. The optical transceiver 122 uses optical wavelengths such as infrared light, visible light, ultraviolet light, and so forth for communication. The optical transceiver 122 may include an optical transmitter system 128 with one or more polarization modulators 196 to modulate light for transmission, including a tracking signal to facilitate tracking. By utilizing the techniques described herein to include the tracking signal using polarization modulation rather than amplitude modulation, the overall link budget available for data transmission is also improved.

The optical transceiver 122 may include an optical detector system 124 and an optical receiver system 126. The optical detector system 124 provides information about a relative alignment of incoming light. This information may then be used to adjust actuators that direct the incoming light into a desired alignment. For example, the optical detector system 124 may determine a distance and direction that the incoming light transmitted by an optical transmitter system 128(2) from the second satellite 102(2) is off center. One or more actuators may be operated responsive to this information to center the incoming light.

The optical detector system 124 may use a polarization analyzer 198 and a detector array 194 to determine output signals. These output signals may be part of a feedback loop that attempts to track the incoming light and maintain a desired alignment of the incoming light. For example, tracking keeps a beam of incoming light centered on an optical fiber that directs the incoming light to a photodetector that is then used to detect changes in the incoming light that is used to send data. Operation of the optical detector system 124 is discussed in more detail in the following description.

One or more ground stations 106 are in communication with one or more satellites 102. The ground stations 106 may pass data between the satellites 102, a management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data 112 or other data between the one or more communication networks and the satellites 102. Such data may be processed by the ground station 106 and communicated via the communication system 140. The communication system 140 of a ground station 106 may include components similar to those of the communication system 120 of a satellite 102 and may perform similar communication functionalities. For example, the communication system 140 may include one or more optical transceivers 122. In other implementations, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The ground stations 106 are in communication with a management system 150. The management system 150 is also in communication, via the ground stations 106, with the satellites 102 and the UTs 108. The management system 150 coordinates operation of the satellites 102, ground stations 106, UTs 108, and other resources of the system 100. The management system 150 may comprise one or more of an orbital mechanics system 152 or a scheduling system 156.

The orbital mechanics system 152 determines orbital data 154 that is indicative of a state of a particular satellite 102 at a specified time. In one implementation, the orbital mechanics system 152 may use orbital elements that represent characteristics of the orbit 104 of the satellites 102 in the constellation to determine the orbital data 154 that predicts location, velocity, and so forth of particular satellites 102 at particular times or time intervals. For example, the orbital mechanics system 152 may use data obtained from actual observations from tracking stations, data from the satellites 102, scheduled maneuvers, and so forth to determine the orbital elements. The orbital mechanics system 152 may also consider other data, such as space weather, collision mitigation, orbital elements of known debris, and so forth.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as the orbital data 154, system status data 158, user terminal data 160, and so forth.

The system status data 158 may comprise information such as which UTs 108 are currently transferring data, satellite availability, current satellites 102 in use by respective UTs 108, capacity available at particular ground stations 106, and so forth. For example, the satellite availability may comprise information indicative of satellites 102 that are available to provide communication service or those satellites 102 that are unavailable for communication service. Continuing the example, a satellite 102 may be unavailable due to malfunction, previous tasking, maneuvering, and so forth. The system status data 158 may be indicative of past status, predictions of future status, and so forth. For example, the system status data 158 may include information such as projected data traffic for a specified interval of time based on previous transfers of user data 112. In another example, the system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data 112 associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of a communication system 120 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes user data 112 between the constellation of satellites 102 and the user device 110. The user data 112 includes data originated by the user device 110 or addressed to the user device 110. The UT 108 may be fixed or in motion. For example, the UT 108 may be used at a residence or on a vehicle such as a car, boat, aerostat, drone, airplane, and so forth.

The UT 108 includes a tracking system 182. The tracking system 182 uses almanac data 184 to determine tracking data 186. The almanac data 184 provides information indicative of orbital elements of the orbit 104 of one or more satellites 102. For example, the almanac data 184 may comprise orbital elements such as "two-line element" data for the satellites 102 in the constellation that are broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite 102(2), time of flight correction, or other information at a specified time. The determination of the tracking data 186 may be ongoing. For example, the UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, the optical transceivers 122 may be used to provide an intersatellite link 190 that provides for communication between satellites 102 in the constellation. In some implementations, the uplink(s) and downlink(s) may use radio wavelengths while the intersatellite link(s) 190 use optical wavelengths. In other implementations, one or more of uplink(s) or downlink(s) may be use optical transceivers 122.

The intersatellite link 190 allows the satellites 102 to transfer data between one another. This data may include tracking, telemetry, and control data. For example, satellite 102(2) may be out of range of a ground station 106 and sends telemetry data using the intersatellite link 190 to satellite 102(1). Satellite 102(1) then relays the telemetry data to the ground station 106 that in turn sends the telemetry data to the management system 150. The intersatellite link 190 may also be used to send user data 112. For example, if ground station 106(1) is unavailable to handle downlink traffic from satellite 102(1), then satellite 102(1) may use the intersatellite link 190 to send the user data 112 to satellite 102(2) that is in communication with ground station 106(2). In another example, user data 112 from a first UT 108(1) that is addressed to a second UT 108(2) may be sent from the first satellite 102(1) to the satellite 102(X) that is providing service to the second UT 108(2) using the intersatellite link 190.

The satellites 102 within the constellation have different orbital parameters. This results in a variety of possible relative motions between satellites 102 in the constellation. For example, if the satellite 102(1) is in an equatorial orbit at a first altitude and satellite 102(2005) is in a polar orbit at a second altitude, they may only be within communication range of one another for a few minutes. Due to the different relative positions of those satellites 102 with respect to Earth at any given time, satellites 102 in the constellation are affected in various ways. For example, satellite 102(2) may experience a slight increase in altitude from a predicted position due to a slight variation in Earth's gravitational field. In another example, a satellite 102 that is in sunlight will experience light pressure causing some slight movement from a predicted position. Additionally, thermal effects such as expansion and contraction, operation of actuators, and so forth introduce vibration into the structure of the satellite 102.

The optical transceivers 122 have a field of view 192. For example, the field of view (FOV) 192 may be determined based on the focal length of an optical system such as a telescope. In one implementation the FOV 192 describes a solid angle within which incoming light will be acquired and directed to various parts of the optical transceiver 122, such as a detector within the optical receiver system 126. For communication to take place, a first beam of light sent by an optical transmitter system 128(2) of the second satellite 102(2) must be within a first FOV 192(1) of the optical transceiver 122(1) of the first satellite 102(1). For bidirectional communication between the satellites 102, the converse must also be true. Continuing the example, a second beam of light sent by an optical transmitter system 128(1) of the first satellite 102(1) must be within a second FOV 192(2) of the optical transceiver 122(2) of the second satellite 102(2).

Because of the dynamic motion of the satellites 102, variances between predicted positions compared to actual positions, vibration, and other factors, it is advantageous to track incoming light to maintain communication. The optical detector system 124 facilitates this tracking by providing information as to a relative location of incoming light with respect to one or more detector arrays 194. Each detector array 194 may comprise a plurality of photodetectors. Output from the optical detector system 124 may then be used to provide for active tracking. For example, output from the optical detector system 124 may be used to adjust a moveable mirror in the optical transceiver 122 to maintain the incoming light in a desired alignment. Continuing the example, the desired alignment may place a spot of the incoming light onto an optical fiber that provides the incoming light to a detector of the optical receiver system 126. In some implementations, the optical transmitter system 128 may utilize a portion of the same optical path. For example, outgoing light from the optical transmitter system 128 may also impinge on the moveable mirror and thus is directed towards optics of the remote optical transceiver 122.

To facilitate operation, the optical detector system 124 may utilize one or more optical components to provide a beam shape on the detector array 194 that is not circular in cross section. This non-spot beam shape provides for an improved slope factor (SF) during operation, substantially reducing the noise equivalent angle (NEA) of the optical detector system 124.

The satellite 102, the ground station 106, the user terminal 108, the user device 110, the management system 150, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
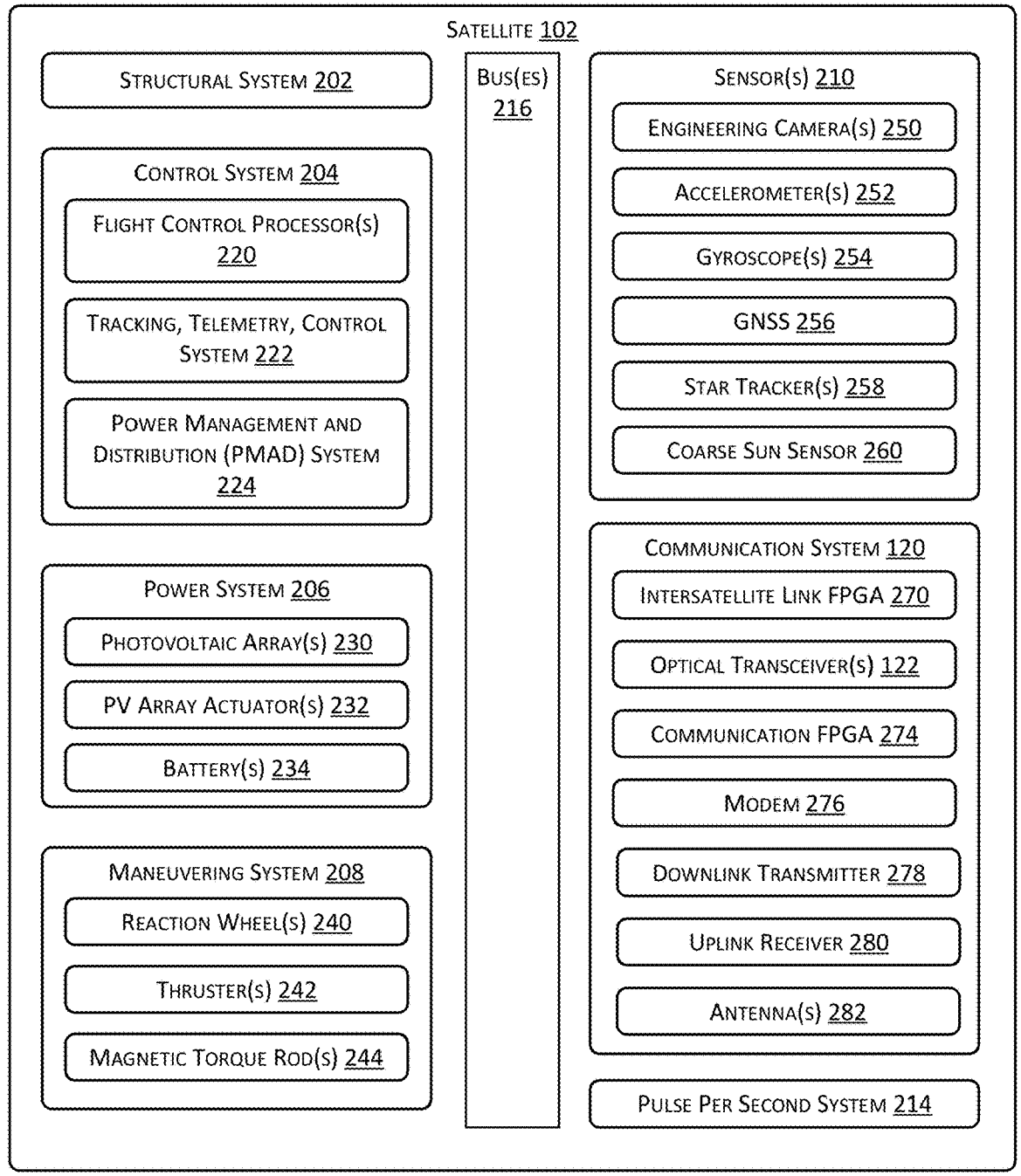
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 120. A pulse per second (PPS) system 214 may be used to provide timing reference to the systems onboard the satellite 102. One or more buses 216 may be used to transfer data between the systems onboard the satellite 102. In some implementations, redundant buses 216 may be provided. The buses 216 may include, but are not limited to, data buses such as Controller Area Network Flexible Data Rate (CAN FD), Ethernet, Serial Peripheral Interface (SPI), and so forth. In some implementations, the buses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 120. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more photovoltaic (PV) array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters may expend propellant. For example, an electrothermal thruster may use water as propellant, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. The satellite 102 may include other sensors 210 as well. For example, the satellite 102 may include a horizon detector, radar, lidar, and so forth.

The communication system 120 provides communication with one or more other devices, such as other satellites 102, ground stations 106, user terminals 108, and so forth. The communication system 120 may include one or more modems, digital signal processors, power amplifiers, antennas 282 (including at least one antenna that implements multiple antenna elements, such as a phased array antenna), lasers, telescopes, photodetectors, processors, memories, storage devices, communications peripherals, interface buses, and so forth. Such components support communications with other satellites 102, ground stations 106, user terminals 108, and so forth using various wavelengths. The communications may involve multiplexing, encoding, and compressing data to be transmitted, modulating the data to a desired frequency, and amplifying it for transmission. The communications may also involve demodulating received signals and performing any necessary de-multiplexing, decoding, decompressing, error correction, and formatting of the signals. Data decoded by the communication system 120 may be output to other systems, such as to the control system 204, for further processing. Output from a system, such as the control system 204, may be provided to the communication system 120 for transmission.

The communication system 120 may include hardware to support the intersatellite link 190. For example, an intersatellite link FPGA 270 may be used to modulate data that is sent and received by an optical transceiver 122 to send data between satellites 102. The optical transceiver 122 may operate using optical wavelengths.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The downlink transmitter(s) 278 and uplink receiver(s) 280 may be implemented as a transceiver. The transceiver may be connected to one or more antennas 282. The satellite 102 may include one or more antennas 282. For example, one or more parabolic antennas may be used to provide communication between the satellite 102 and one or more ground stations 106. In another example, a phased array antenna may be used to provide communication between the satellite 102 and the UTs 108.

The phased array antenna contains many elements and uses slight differences in timing or phase of the signals to produce a beamforming effect that directs a signal to transmit or receive in a particular direction relative to the phased array antenna. For example, a phased array antenna system may include antenna control electronics controlling a radio frequency (RF) feeding network. The RF feeding network may include a plurality of signal conditioning components interposed between antenna elements and the transceivers. The signal conditioning components introduce one or more of a phase modulation or an amplitude modulation to the signal sent to the antenna elements. This introduces a progressive phase modulation and produces interference in the individual transmission of each antenna element, producing directivity or gain in a particular direction. The phase modulation imposed on each antenna element will differ and will be dependent on a spatial location of a communication target that determines an optimum beam vector (e.g., where the beam vector is found by one or more of maximizing signal intensity or connection strength). The optimum beam vector may change with time, such as when a communication target moves relative to the phased array antenna system.

Figure 3:
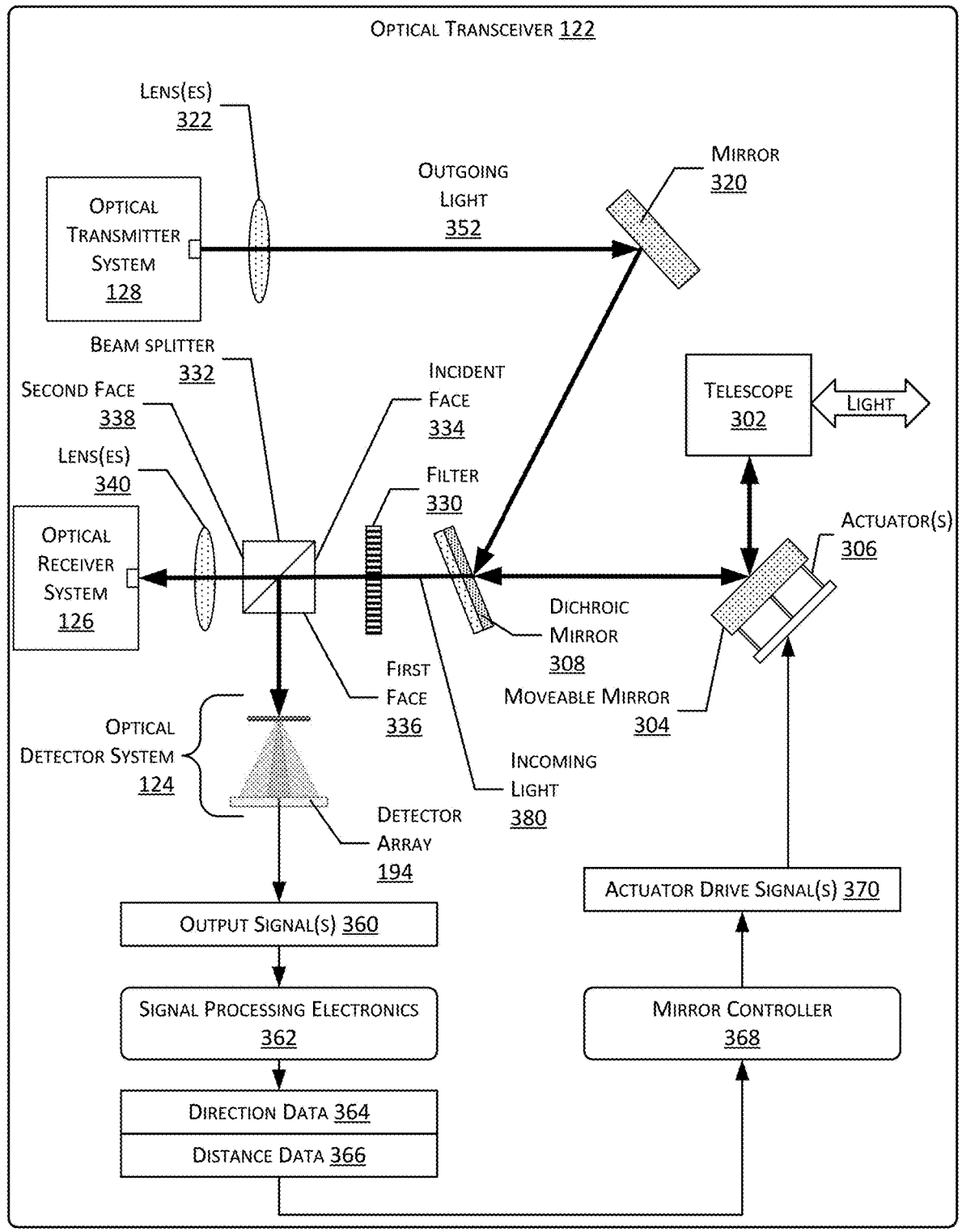
FIG. 3 is a block diagram of the optical transceiver, according to some implementations.

FIG. 3 is a block diagram 300 of the optical transceiver 122, according to some implementations. A telescope 302 or other arrangement of optical elements sharing a common aperture may be used to acquire incoming light 380 and direct outgoing light 352. For example, the telescope 302 may comprise one or more lenses, mirrors, or other optical components. An optical path of the optical transceiver 122 may include one or more moveable mirrors 304 with one or more associated actuators 306. During operation, the one or more moveable mirrors 304 may change a path of one or more of the incoming light 380 or the outgoing light 352. In some implementations the moveable mirror 304 and the actuator 306 may comprise a microelectromechanical system. In some implementations the actuators 306 may comprise motors, piezoelectric devices, voice coils, and so forth. For example, a fast steering mirror (FSM) comprising a mirror that is moved based on activation of a voice coil may be used as the moveable mirror 304 and the actuator 306.

A dichroic mirror 308 may be used to selectively direct particular wavelengths of light between the optical transmitter system 128 and the optical receiver system 126. For example, the dichroic mirror 308 may pass incoming light 380 with a first wavelength to the optical receiver system 126 while reflecting outgoing light 352 with a second wavelength.

The optical transmitter system 128 may comprise a light source, such as a light emitting diode, quantum dot, laser, and so forth. The optical transmitter system 128 also includes one or more devices to modulate and amplify light from the light source to produce outgoing light 352. The optical transmitter system 128 accepts data for transmission during operation. The optical transmitter system 128 also modulates one or more polarization parameters of the outgoing light 352 to convey a tracking signal. This is discussed in more detail with regard to FIG. 7.

The outgoing light 352 may pass through one or more lenses 322, mirrors 320, and so forth. The outgoing light 352 may be incident to the dichroic mirror 308 and then subsequently is reflected to the moveable mirror 304. The moveable mirror 304 reflects the outgoing light 352 into the telescope 302. The telescope 302 directs the outgoing light 352 towards the receiving optical transceiver 122, such as in another satellite 102, at a ground station 106, and so forth.

The incoming light 380 is directed by the dichroic mirror 308 towards the optical receiver system 126. In some implementations a filter 330 may be in the optical path. The filter 330 may be used to remove unwanted or undesirable wavelengths of light. The incoming light 380 may pass through a beam splitter 332. In this illustration, the beam splitter 332 is depicted as a cubical beam splitter comprising two triangular prisms. In other implementations other beam splitter designs may be used, such as a half-silvered mirror.

In one implementation, the beam splitter 332 may have an incident face 334, a first face 336, and a second face 338. For example, the beam splitter 332 may comprise a cubical beam splitter. The incident face 334 is a portion of the beam splitter 332 upon which the incoming light 380 impinges.

The first face 336 comprises a portion of the beam splitter 332 from which a first portion of the incoming light 380 is emitted. For example, the first face 336 may comprise the face from which a reflection of the incoming light 380 is directed. The second face 338 comprises a portion of the beam splitter 332 from which a second portion of the incoming light 380 is emitted. For example, the second face 338 may comprise the face from which the incoming light 380 is transmitted or not otherwise reflected and may be directed towards the optical receiver system 126.

The incoming light 380 emitted from the first face 336 passes into the optical detector system 124. The optical detector system 124 includes the polarization analyzer 198. The polarization analyzer 198 converts a polarization modulated tracking signal that may be present in the incoming light 380 into an amplitude modulated tracking signal. The detector array 194 provides as output one or more output signals 360 responsive to this amplitude modulated tracking signal. For example, each photodetector may provide an output signal 360 having a current that is representative of the power of incident light incident on that photodetector.

The output signals 360 may be processed by signal processing electronics 362. The signal processing electronics 362 may accept the analog signals from the photodetectors as input and provide as output digital data, such as intensity data. For example, the signal processing electronics 362 may comprise one or more of an ammeter, transimpedance amplifier, analog to digital converter (ADC), and so forth. In some implementations the signal processing electronics 362 may include one or more processors. These processors may perform one or more functions, including but not limited to denoising, averaging, and so forth.

The signal processing electronics 362 may provide as output direction data 364 and distance data 366. The direction data 364 may be indicative of a direction of a center of the incoming light 380 with respect to one or more axes and relative to a predetermined point on the detector array 194. For example, the direction data 364 may be indicative of an angle. The distance data 366 may be indicative of a distance of a center of the incoming light 380 with respect to the predetermined point relative to the detector array 194. For example, the distance data 366 may be indicative of a distance in micrometers. In some implementations the direction data 364 and the distance data 366 may be combined. For example, the output from the signal processing electronics 362 may be indicative of a set of cartesian coordinates with respect to the X and Y axes of the detector array 194. A set of coordinates would thus indicate direction and distance of the first portion or spot relative to an origin of the axes, where the origin coincides with the predetermined point such a center of the detector array 194.

The output from the signal processing electronics 362 may be provided to a mirror controller 368. For example, the mirror controller 368 may comprise a processor that accepts the direction data 364 and the distance data 366 and determines a magnitude and direction of movement of the moveable mirror 304. The mirror controller 368 may generate as output one or more actuator drive signals 370. The actuator drive signals 370 may then be used to operate the one or more actuators 306. When operated, the actuators 306 move the moveable mirror 304, changing the path of the light incident thereon.

The system may thus operate in a feedback loop, with the output from the optical detector system 124 resulting in the actuator drive signals 370 that may be used to provide tracking. During tracking, the path of the incoming light 380 is changed by the movement of the moveable mirror 304 to maintain the desired alignment of the incoming light 380. This desired alignment may result in the light entering the optical receiver system 126. For example, by aligning the incoming light 380 with respect to the detector array 194 the incoming light 380 is also aligned with respect to the optical input of the optical receiver system 126.

The incoming light 380 emitted from the second face 338 may pass through one or more lenses 340 before entering the optical receiver system 126. The optical receiver system 126 may comprise one or more optical amplifiers, detectors, demodulators, and so forth. During operation, the optical receiver system 126 may provide data as output.

In other implementations other arrangements of the various components of the optical transceiver 122 or a portion thereof may be used. For example, a combination device that operates as a dichroic filter 308 and beam splitter 332 may be used. In another implementation the filter 330 may be omitted. In some implementations, the optical transmitter system 128 may be omitted and the resulting system is limited to receiving data. In other implementations the optical receiver system 126 may be omitted and the resulting system is limited to transmitting data.

In other implementations, the system 100 may be used to facilitate tracking of an object. For example, instead of or in addition to transferring data, the outgoing light 352 may be used to illuminate an object, such as a satellite 102. The incoming light 380 may comprise the outgoing light 352 as reflected by the object. The system may thus be used to track the object so illuminated.

Figure 4:
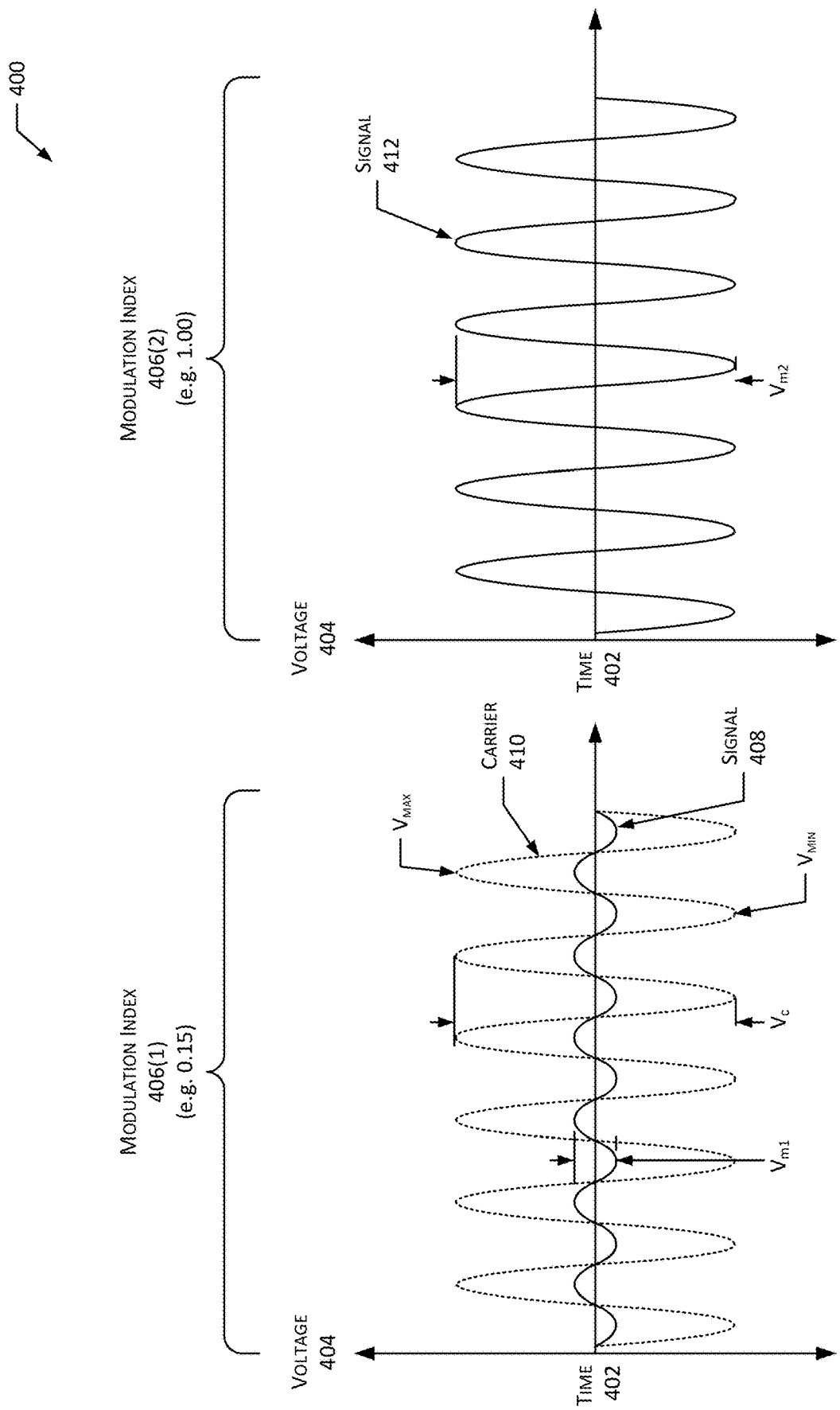
FIG. 4 illustrates waveforms of a tracking signal with different modulation indices, according to some implementations.

FIG. 4 illustrates at 400 waveforms of a tracking signal with different modulation indices, according to some implementations. Two waveforms are illustrated with time 402 increasing left to right along a horizontal axis and voltage 404 along a vertical axis.

A first modulation index 406(1) of 0.15 is shown for a signal 408 relative to a carrier 410. The modulation index is a ratio of a modulated signal relative to a carrier. For example, where Vm is a maximum amplitude of the signal 408 and Vc is a maximum amplitude of the carrier 410, the modulation index may be calculated as:

$$\text{modulation index} = \frac{V_m}{V_c} \qquad \text{(Equation 1)}$$

A second modulation index 406(2) of 1.00 is shown for a signal 412, relative to the carrier 410.

Figure 7:
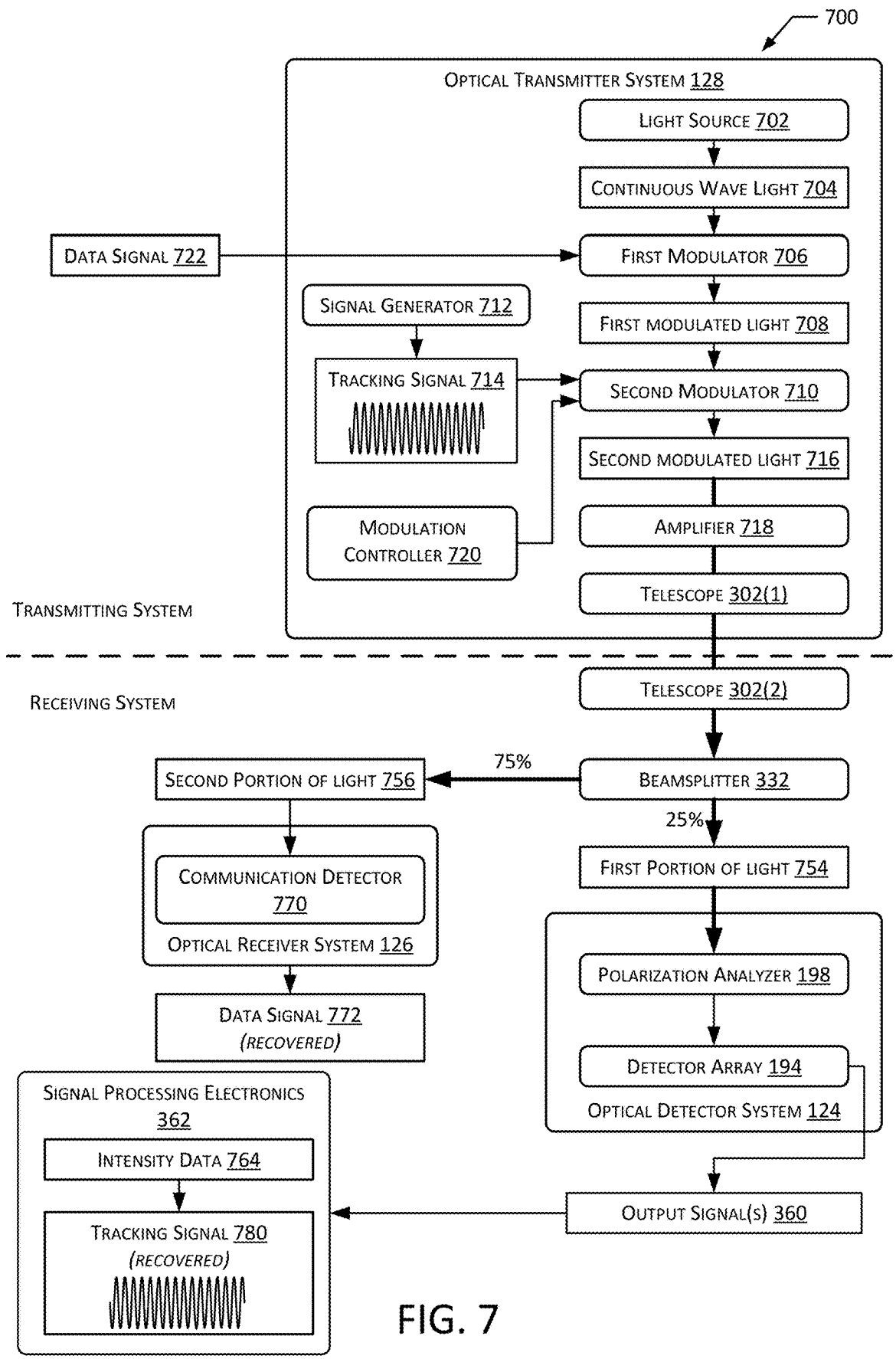
FIG. 7 illustrates a block diagram of a first implementation of a transmitter and a receiver that modulates one or more polarization parameters of outgoing light to convey a tracking signal, according to some implementations.

As described in more detail with respect to FIG. 7, the ability of the system described herein to increase the modulation index 406 without impairing data transmission results in a substantial increase in optical SNR of the tracking signal at the detector array 194. For example, given the beamsplitter 332 directing 25% of the incoming light to the optical detector system 124, a modulation index of 1.0 as compared to 0.15 results in an approximately 8.2 dB increase in optical SNR at the detector array 194.

Figure 5:
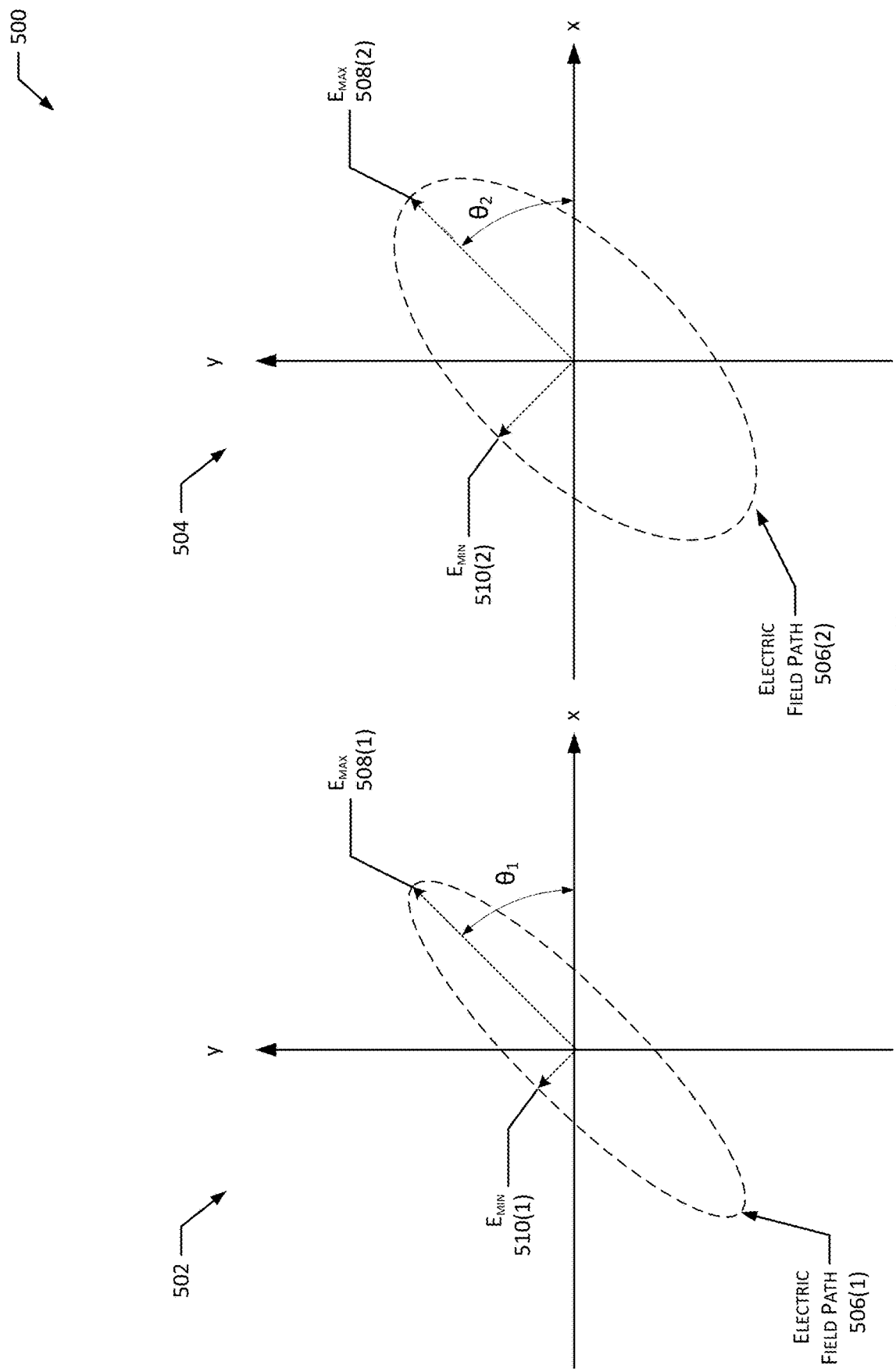
FIG. 5 illustrates a polarization parameter of polarization ellipticity, according to some implementations.

FIG. 5 illustrates at 500 a polarization parameter of polarization ellipticity, according to some implementations. At 502 a first polarization ellipticity is shown. A first electric field path 506(1) is illustrated by the broken line. This may be considered to represent a path traced by a leading edge of an electric field of the outgoing light 352 over an interval of time. Shown are an x axis and a y axis that are orthogonal to one another. Emax 508(1) is shown indicating a distance from an origin of the x and y axes at a center of the electric field path 506 along a major axis of the electric field path 506(1). Emin 510(1) is shown indicating a distance from the origin along a minor axis of the electric field path 506(1). The polarization ellipticity may be expressed as a ratio of Emax 508 and Emin 510.

$$\text{polarization ellipticity} = \frac{E_{min}}{E_{max}} \quad \text{(Equation 2)}$$

In this example, the polarization ellipticity of 502 is less than the polarization ellipticity of 504. The tracking signal may be imposed on the outgoing light 352 by modulating the polarization ellipticity 502.

Also depicted is an angle θ between a line extending along a major axis of the electric field path 506 and the x axis. Changes to the angle θ over time is indicative of polarization rotation, as discussed in FIG. 6.

Figure 6:
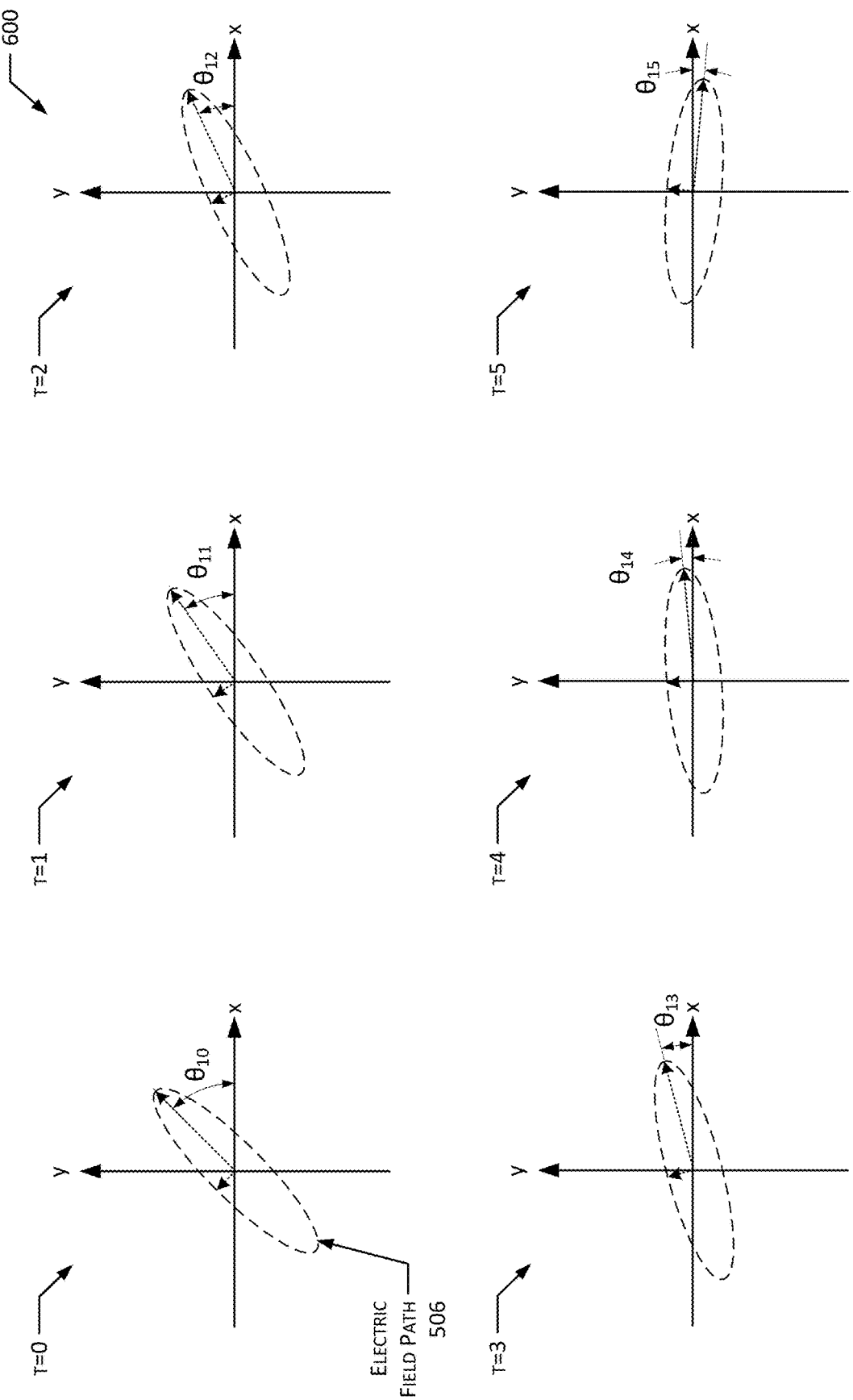
FIG. 6 illustrates a polarization parameter of polarization rotation, according to some implementations.

FIG. 6 illustrates at 600 the polarization parameter of polarization rotation, according to some implementations. The polarization rotation is indicative of a change in an angle θ that is between a line extending along a major axis of the electric field path 506 and the x axis.

In this illustration, from times t=0 through t=5, the polarization ellipticity is remaining constant while the polarization rotation θ changes. The tracking signal may be imposed on the outgoing light 352 by modulating the polarization rotation θ. The tracking signal may also be imposed on the outgoing light 352 by modulating the polarization ellipticity and the polarization rotation.

FIG. 7 illustrates a block diagram 700 of a first implementation of a transmitter and a receiver that modulates one or more polarization parameters of outgoing light 352 to convey a tracking signal, according to some implementations.

A transmitting system, such as a first satellite 102(1), has an optical transmitter system 128. The optical transmitter system 128 comprises a light source 702. For example, the light source 702 may comprise a laser, light emitting diode, quantum dot, and so forth. In one implementation, the light source 702 may comprise a laser that produces as output continuous wave light 704 that is otherwise unmodulated.

A first modulator 706 modulates the incoming continuous wave light 704 based on a data signal 722 to produce first modulated light 708. In one implementation, the first modulator 706 may comprise an electro-optic modulator that varies one or more characteristics of the continuous wave light 704 to represent the data signal 722. For example, the first modulator 706 may modulate a state of polarization (SOP) of the continuous wave light 704 to represent the data signal 722. The data signal 722 may be provided at a first frequency. For example, the data signal 722 may have a frequency of greater than 1 megahertz (MHz). The first modulator 706 may use phase modulation to convey the data signal 722 using quadrature phase shift keying (QPSK) to provide a throughput of 100 gigabits per second (Gbps).

The first modulated light 708 is provided as input to a second modulator 710. A signal generator 712 provides a tracking signal 714 to the second modulator 710. For example, the signal generator 712 may generate a tracking signal 714 with a sinusoidal waveform having a second frequency. This second frequency may be less than the first frequency associated with the data signal 722. For example, the second frequency may be less than 50 kilohertz (KHz). The second frequency may be selected based on various criteria. For example, the second frequency may be below a threshold level at which data transmission is impaired.

Continuing the example, the optical receiver system 126 may be able to reliably demodulate the data signal 722 in the presence of variations resulting from a 20 kHz tracking signal 714. The second modulator 710 provides second modulated light 716 as output.

In one implementation, the second modulator 710 may comprise an electro-optic modulator. For example, an electro-optic modulator from EOSpace Inc. of Redmond, Wash., United States of America may be used. The second modulator 710 may be used to modify one or more polarization parameters of the incoming first modulated light 708. For example, the second modulator 710 may vary one or more of polarization ellipticity or polarization rotation based on the tracking signal 714.

A modulation controller 720 is used to control the operation of the second modulator 710. In one implementation, the modulation controller 720 may sweep through a continuum of polarization stages such that the AM of the first portion of light 754 on the detector array 194 is provided regardless of arbitrary orientation of the polarization analyzer 198. The modulation controller 720 may dither or randomly apply noise to induce changes to one or more polarization parameters in the second modulated light 716, responsive to the tracking signal 714. Precise control over polarization by the second modulator 710 is thus not necessary. In one implementation, the modulation controller 720 may dither the state of polarization across points of a Poincare sphere to represent the tracking signal 714. In some implementations, some points with respect to the Poincare sphere may be disallowed in accordance with the constraints associated with the polarization parameters. Operation of the modulation controller 720 is discussed in more detail with regard to FIG. 8.

The second modulated light 716 may be provided to an amplifier 718. The amplifier 718 may comprise a doped fiber amplifier (DFA). For example, the amplifier 718 may comprise an erbium-doped fiber amplifier (EDFA).

The now-amplified second modulated light 716, or amplified light, may then be provided to a telescope 302(1) for transmission to the receiving system. For example, the outgoing light 352 may comprise the second modulated light 716 that is steered via a moveable mirror 304 to the receiving system.

The receiving system has a telescope 302(2) that is used to acquire amplified light from the transmitting system. For example, the second satellite 102(2) may use a telescope 302(2) to acquire the second modulated light 716 from the first satellite 102(1).

The amplified light, comprising the second modulated light 716, is divided using the beamsplitter 332. A first portion of light 754 is directed by the beamsplitter 332 towards the optical detector system 124. A second portion of light 756 is directed towards the optical receiver system 126. In this illustration, the first portion of light 754 has 25% of the total power of the amplified light prior to entry to the beamsplitter 332 while the second portion of the light 756 has 75%. Other losses associated with the beamsplitter 332 are not discussed in the interest of clarity.

The optical detector system 124 comprises the polarization analyzer 198. The polarization analyzer 198 may comprise a polarizing filter. For example, the polarizing filter may comprise wire grid polarizer, birefringent polarizer, thin film polarizer, Fresnel reflector(s), and so forth. In one implementation, the polarizing analyzer 198 may have a polarization that is fixed, relative to the structure of the optical detector system 124. For example, the polarizing analyzer 198 may be affixed to a structure of the optical detector system 124.

In another implementation, the polarizing analyzer 198 may be variable. For example, the polarizing analyzer 198 may comprise a stepper motor to rotate a wire grid polarizer. In another example, the polarizing analyzer 198 may comprise a photoelastic modulator. With this implementation, during operation the optical detector system 124 may operate the polarization analyzer 198 to vary the polarization until a maximum or minimum intensity is observed at the detector array 194. For example, the optical detector system 124 may sweep through a specified range of polarization angles until maximum intensity (brightness) is detected by the detector array 194. This may further improve performance of the system by increasing observed variation in amplitude.

Figure 11:
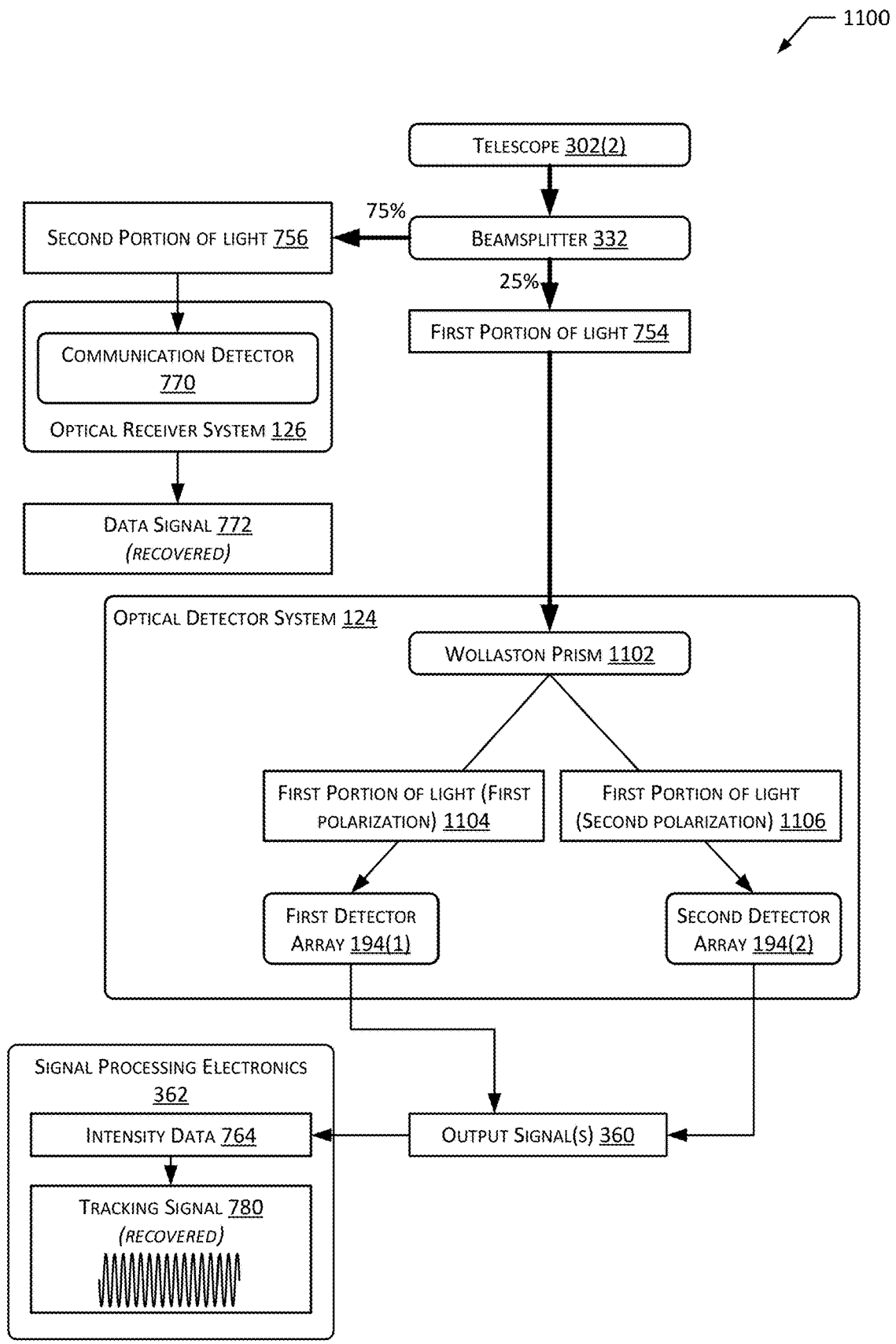
FIG. 11 illustrates a block diagram of a second implementation of a receiver to recover a tracking signal, according to some implementations.

Another implementation is discussed with regard to FIG. 11. In that implementation, the polarization analyzer 198 comprises a Wollaston prism and a pair of detector arrays 194.

The first portion of light 754 passes through the polarization analyzer 198 and impinges upon the detector array 194. The polarization analyzer 198 has the effect of converting the polarization modulation (PM) within the first portion of light 754 into amplitude modulation (AM) of intensity of the first portion of light 754. For example, where the polarization of the first portion of light 754 is parallel to the polarization of the polarizing filter, the amplitude of the light on the detector array 194 is at a maximum (brightest). Continuing the example, where the polarization of the first portion of light 754 is perpendicular to the polarization of the polarizing filter, the amplitude of the light on the detector array 194 is at a minimum (dimmest). The modulation controller 720 is configured to operate the second modulator 710 such that the PM is configured to provide a relatively high modulation index at the detector array 194. For example, the PM may result in a modulation index of between 0.70 and 1.0 of the tracking signal 714 at the detector array 194. The relative orientation between the transmitting system and the receiving system may be arbitrary. For example, rotation of the first satellite 102(1) relative to the beam of amplified light may differ from rotation of the second satellite 102(2). The modulation controller 720 may modify the polarization parameters such that a minimum modulation index is maintained for an arbitrary difference in orientation.

The output signal(s) 360 from the detector array 194 are provided to the signal processing electronics 362. In one implementation, the output signals 360 may be used to provide intensity data 764 that is indicative of the intensity of the light on the detector array 194 or particular detectors therein, at particular times. For example, the intensity data 764 may comprise a time series of intensity values. Because of the PM at the transmitting system and the resulting transition to AM within the optical detector system 124, the intensity data 764 may be processed to recover the tracking signal 780. For example, the intensity data 764 may include a variation in intensity values over time that is consistent with a sinusoidal change in intensity with a frequency corresponding to the tracking signal 714.

The tracking signal 714, and recovered tracking signal 780, may be relatively narrow in bandwidth. For example, the bandwidth of the tracking signal 714 may be less than 250 Hz. Because noise is proportional to bandwidth of a signal, as the bandwidth of the tracking signal 714 decreases, noise within the recovered tracking signal 780 is also reduced. By reducing noise, overall performance of the system is improved.

The detector array 194 comprises a plurality of photodetectors. The photodetectors may comprise photomultiplier tubes (PMT), silicon photomultipliers, avalanche photodiodes, and so forth. In one implementation, the detector array 194 may comprise four photodetectors(1)-(4) arranged in a two-by-two array. For example, the detector array 194 may comprise four indium gallium arsenide (InGaAs) photodiodes in a common package, such as the G6849 series from Hamamatsu Photonics K.K. of Japan. In other implementations the detector array 194 may use other arrangements of a plurality of photodetectors. For example, if tracking with respect to a single axis is needed, two or more photodetectors may be arranged in a line. In another example, the detector array 194 may comprise an eight-by-eight array of 64 photodetectors. In still another example, the detector array 194 may comprise an imaging device such as a charge coupled device (CCD), complementary metal oxide semiconductor (CMOS) imager, and so forth.

The photodetectors provide as output a signal that is indicative of light incident upon their active area. For example, light incident on an active portion of a photodetector may produce an output current that is proportionate to power of the incident light. Individual photodetectors may be separated from one another by a gap. For example, the gap may be 30 micrometers.

The optical detector system 124 may include one or more optical elements. In some implementations, at least a portion of the optical elements may reshape the beam of incoming light 380 into a non-spot beam shape. To provide for beam reshaping, the optical elements may include one or more lenses such as a cylindrical lens or other elements comprising a plurality of diffractive features. Non-spot beam shapes may include, but are not limited to, rectangles, crosses, and so forth. For example, a pair of photodetector arrays 194(1) and 194(2) may be used. Each may have a non-spot beam shape impinging thereon of rectangles, the rectangles being perpendicular to each other.

Returning to the beamsplitter 332, the second portion of light 756 is directed onto a communication detector 770 of the optical receiver system 126. The communication detector 770 may comprise one or more photodetectors, polarization analyzers, or other devices. During operation, the output signals from the communication detector 770 may be processed to determine the data signal 772 recovered from the second modulated light 716. The frequency of the tracking signal 714 may be selected to be sufficiently low that the modulation imposed on the first modulated light 708 does not impair the recovery of the data signal 772 at the receiving device.

During operation, the optical detector system 124 provides the tracking as discussed with regard to FIG. 3 to direct the second portion of light 756 onto the communication detector 770. For example, tracking provided by the mirror controller 368 may direct the second portion of light 756 onto an optical fiber that is connected to the input of the communication detector 770.

The system 100 may also be utilized in other configurations. For example, a first satellite 102(1) may generate and send carrier light modulated with the tracking signal 714 towards a second satellite 102(2). The second satellite 102(2) may include a modulating retroreflector that modulates the carrier light based on a data signal 722 and reflects back to the first satellite 102(1) the modulated carrier light that now includes modulation of the tracking signal 714 and the modulation to convey data.

Figure 8:
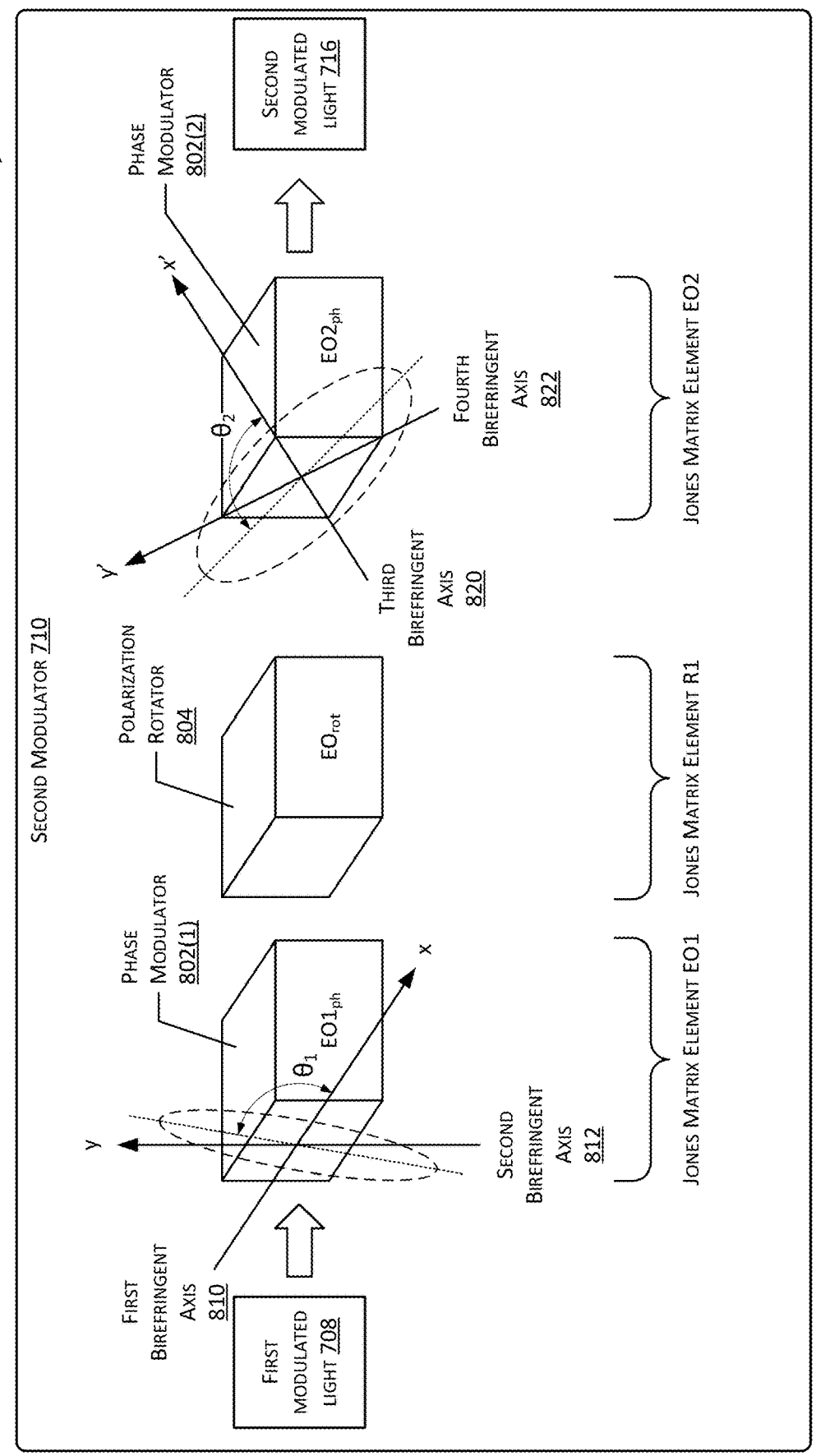
FIG. 8 illustrates a block diagram of a modulator to change one or more polarization parameters of light, according to some implementations.

FIG. 8 illustrates a block diagram 800 of a modulator to change one or more polarization parameters of light, according to some implementations. In this illustration, the second modulator 710 is shown. The techniques and operation described may also be utilized in implementations in which the optical transmitter system 128 utilizes a single modulator.

The second modulator 710 may comprise a first phase modulator 802(1) and a second phase modulator 802(2). These phase modulators 802 may comprise birefringent electro-optical devices. For example, the second modulator 710 may comprise a polarization controller from EOSpace, Inc. The first phase modulator 802(1) is associated with birefringence phase modulation "EO1". The second phase modulator 802(2) is associated with birefringence phase modulation "EO2".

The first phase modulator 802(1) has a first birefringent axis 810 "x" and a second birefringent axis 812 "y". The first birefringent axis 810 is perpendicular to the second birefringent axis 812.

The second phase modulator 802(2) has a third birefringent axis 820 "x'" and a fourth birefringent axis 822 "y'". The third birefringent axis 820 is perpendicular to the fourth birefringent axis 822.

In this illustration, the third birefringent axis 820 is offset by 45 degrees relative to the first birefringent axis 810.

In some implementations, a polarization rotator 804 may be arranged between the first phase modulator 802(1) and the second phase modulator 802(2). The polarization rotator 804 may comprise an x-cut, z-propagating $LiNbO_3$ titanium-indiffused waveguide that provides continuous polarization rotation from a transverse electric (TE) mode to a transverse magnetic (TM) mode. The polarization rotator 804 may be omitted in implementations where a polarization maintaining fiber is used between the first phase modulator 802(1) and the second phase modulator 802(2).

The modulation controller 720 may modulate one or more polarization parameters such as polarization ellipticity or polarization rotation. Operation of the system with respect to the polarization parameters as implemented by the modulation controller 720 may be characterized using the following Jones Matrix Formulations.

$$E1_{out} = C2[EO2]C1[R1][EO1][E1_{in}]$$

where $$E1_{in}(\delta, \theta_e) = \begin{bmatrix} 1 \\ e^{j\delta} \end{bmatrix} \begin{bmatrix} \cos(\theta_e) & \sin(\theta_e) \\ -\sin(\theta_e) & \cos(\theta_e) \end{bmatrix}$$

$\theta_e$ = the additional polarization ellipse angular rotation of the first modulated light 708 into the first phase modulator 802(1), and $\delta$ = phase difference between the $x$ and $y$ components of $E1_{in}$.

$EO1 =$ $$\begin{bmatrix} \cos^2(\theta_1) + e^{j\eta_{1m}(f_1,\eta_1,t)}\sin^2(\theta_1) & (1 - e^{-j\eta_{1m}(f_1,\eta_1,t)})e^{j\rho_3(\phi_1,t)}\sin(\theta_1)\cos(\theta_1) \\ (1 - e^{-j\eta_{1m}(f_1,\eta_1,t)})e^{j\rho_3(\phi_1,t)}\sin(\theta_1)\cos(\theta_1) & \sin^2(\theta_1) + e^{j\eta_{1m}(f_1,\eta_1,t)}\cos^2(\theta_1) \end{bmatrix}$$

$C1 = e^{-j\eta_{1m}(f_1,\eta_1,t)/2}$ where the birefringence phase modulation $(EO1) = \eta_{1m} = \eta_1 \sin(2\pi f_1 t + \varphi_1)$ $\eta_1$ is the amplitude, $f_1$ is the modulating frequency, $t$ = time, $\theta_1$ is the SOP angle with respect to specified frame coordinates, and $\rho_3$ is the circular birefringence (not used in this example), and $\varphi_1$ is the phase.

$$R1 = \begin{bmatrix} \cos(\theta_{r1}(t)) & \sin(\theta_{r1}(t)) \\ -\sin(\theta_{r1}(t)) & \cos(\theta_{r1}(t)) \end{bmatrix}$$

where $\theta_{r1}(t) = A_{r1}\sin(2\pi f_3 t + \varphi_3)$, and $f_3$ = frequency of rotation modulation $$EO2 = \begin{bmatrix} \cos^2(\theta_2) + e^{j\eta_{2m}(f_2,\eta_2,t)}\sin^2(\theta_2) & (1 - e^{-j\eta_{1m}(f_2,\eta_2,t)})e^{j\rho_4(\phi_1,t)}\sin(\theta_2)\cos(\theta_2) \\ (1 - e^{j\eta_{2m}(f_2,\eta_2,t)})e^{j\rho_4(\phi_1,t)}\sin(\theta_2)\cos(\theta_2) & \sin^2(\theta_2) + e^{j\eta_{2m}(f_2,\eta_2,t)}\cos^2(\theta_2) \end{bmatrix}$$

$C2 = e^{-j\eta_{2m}(f_2,\eta_2,t)/2}$ where the birefringence phase modulation $(EO2) = \eta_{2m} = \eta_2 \sin(2\pi f_2 t + \varphi_2)$, and $\eta_2$ is the amplitude, $f_2$ is the modulating frequency, $t$ = time, $\theta_2$ is the SOP angle with respect to specified frame coordinates into the second EO phase modulator, and $\rho_4$ is the circular birefringence (not presently used), and $\varphi_2$ is the phase.

For an arbitrary polarization analyzer 198 orientation of α, the resultant E-field after the polarization analyzer 198 is given by $$E_{OX}(\theta_e, \delta, \alpha, t) = \quad \text{(Matrix Formulations 1)}$$

$$\begin{bmatrix} 1 & 0 \\ 0 & 0 \end{bmatrix} \begin{bmatrix} \cos^2(\alpha) & \sin(\alpha)\cos(\alpha) \\ \sin(\alpha)\cos(\alpha) & \cos^2(\alpha) \end{bmatrix}$$

$$E1_{in}(\theta_e, \delta, t)$$

$$E_{OY}(\theta_e, \delta, \alpha, t) = \begin{bmatrix} 0 & 0 \\ 0 & 1 \end{bmatrix}$$

$$\begin{bmatrix} \cos^2(\alpha) & \sin(\alpha)\cos(\alpha) \\ \sin(\alpha)\cos(\alpha) & \cos^2(\alpha) \end{bmatrix}$$

$$E1_{in}(\theta_e, \delta, t)$$

The optical power P on the detector array 194 after the polarization analyzer 198 is then $$P_o(\theta_e, \delta, \alpha, t) =$$

$$|E_{OX}(\theta_e, \delta, \alpha, t)E^*_{OX}(\theta_e, \delta, \alpha, t)| +$$

$$|E_{OY}(\theta_e, \delta, \alpha, t)E^*_{OY}(\theta_e, \delta, \alpha, t)|$$

Techniques such as Monte Carlo analyses may be used to determine particular polarization parameters that provide desired amplitude modulation at the detector array 194. In one set of experiments, Monte Carlo analysis was found to produce a modulation index of at least 0.734 for an arbitrary orientation between the transmitting system and the polarization analyzer 198 of the receiving system when:

$$\eta_1 = \eta_2 = \pi, A_{r1} = \frac{\pi}{2}, \varphi_1 = 112.5°, \text{ and } \varphi_2 = 0° \quad \text{(Parameters 1)}$$

During operation, the modulation controller 720 may dither one or more polarization parameters within the specified constraint. For example, the second modulator 710 may dither the state of polarization, within the constraints imposed by Parameters 1, to impose the tracking signal 714 on the first modulated light 708 and produce the second modulated light 716.

Figure 9:
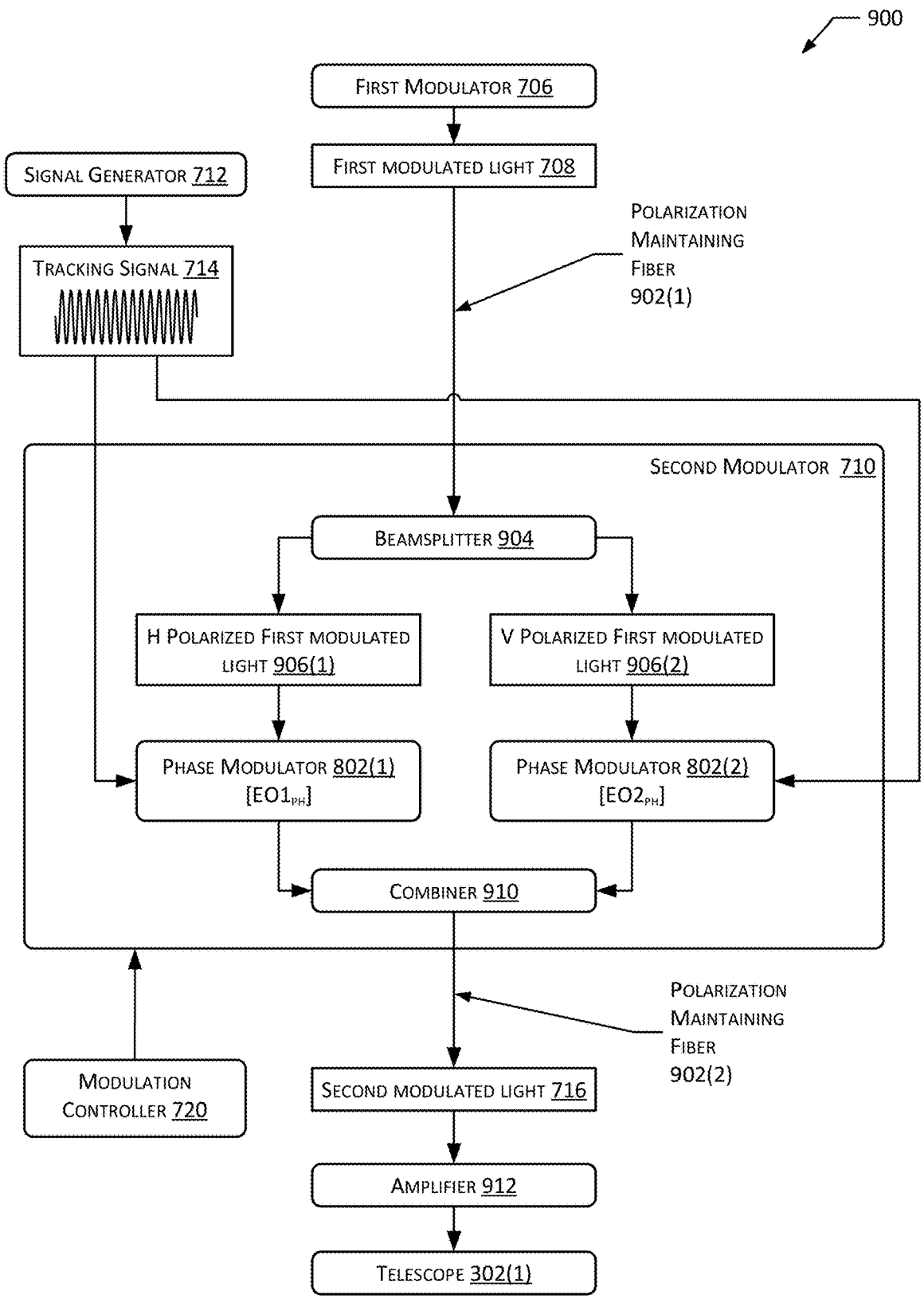
FIG. 9 illustrates a block diagram of a second implementation of a transmitter to modulate one or more polarization parameters to convey a tracking signal, according to some implementations.

FIG. 9 illustrates a block diagram 900 of a second implementation of a transmitter to modulate one or more polarization parameters to convey a tracking signal, according to some implementations. This implementation utilizes a second modulator 710 that separates the first modulated light 708 into two linear polarizations, modulates each of those polarizations, and then combines the output to produce the second modulated light 716.

In this implementation, a first polarization maintaining fiber (PMF) 902(1) conveys the first modulated light 708 to an input of the second modulator 710. The PMF 902 maintains a specified polarization of light that propagates through the fiber.

The second modulator 710 may comprise a beamsplitter 904 that divides the first modulated light 708 into H polarized first modulated light 906(1) and V polarized first modulated light 906(2). For example, the H polarized first modulated light 906(1) may comprise linearly polarized light parallel to the x axis, while the V polarized first modulated light 906(2) may comprise linearly polarized light that is parallel to the y axis.

The second modulator 710 may comprise the first phase modulator 802(1) and the second phase modulator 802(2). The phase modulators 802(1)-(2) may be driven by the tracking signal 714. The H polarized first modulated light 906(1) is modulated by the first phase modulator 802(1), with the output provided to a first port of a combiner 910. The V polarized first modulated light 906(2) is modulated by the second phase modulator 802(2), with the output provided to a second port of the combiner 910.

The combiner 910 combines the inputs to produce the second modulated light 716. A second PMF 902(2) may propagate output from the combiner 910 to a polarization maintaining amplifier 912. The amplified second modulated light 716 may then be sent using the telescope 302(1).

Figure 10:
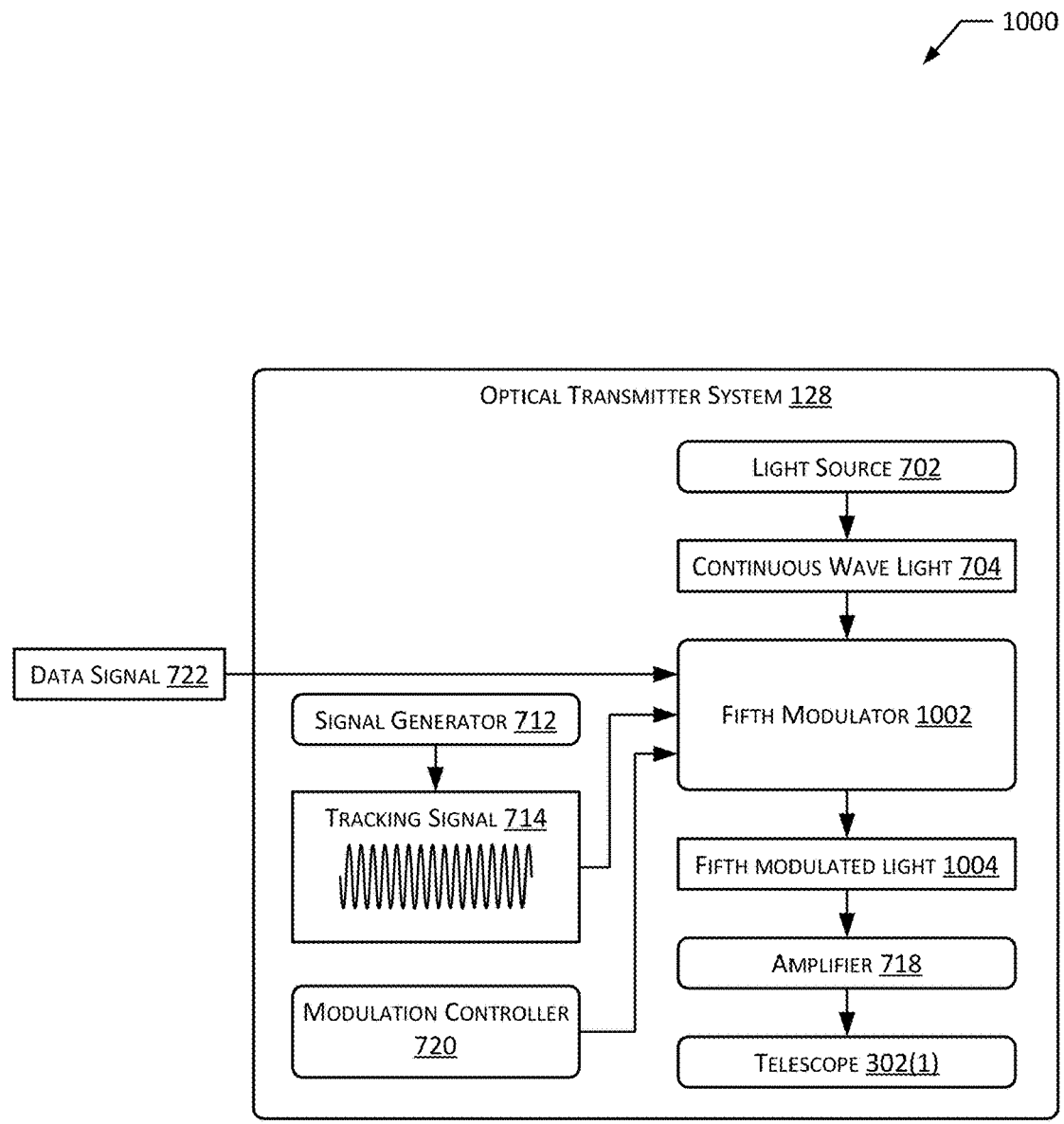
FIG. 10 illustrates a block diagram of a third implementation of a transmitter to modulate one or more polarization parameters to convey a tracking signal, according to some implementations.

FIG. 10 illustrates a block diagram 1000 of a third implementation of a transmitter to modulate one or more polarization parameters to convey a tracking signal, according to some implementations. In some implementations, a single modulator may be used to modulate the continuous wave light 704 to convey both the data signal 722 and the tracking signal 714, eliminating the second modulator 710.

The light source 702 provides the continuous wave light 704 to a fifth modulator 1002 that produces fifth modulated light 1004. The fifth modulator 1002 receives as input the data signal 722 and the tracking signal 714. Modulation of the tracking signal 714 may be controlled by the modulation controller 720. For example, the fifth modulator 1002 may comprise an electro-optical modulator that provides an external electrical interface that accepts the tracking signal 714 and is able to modulate the continuous wave light 704 with that tracking signal 714, producing a low frequency phase modulation.

The fifth modulated light 1004 may then be provided to an amplifier 718 for amplification. The now-amplified fifth modulated light 1004 may be sent using the telescope 302(1).

FIG. 11 illustrates a block diagram 1100 of a second implementation of a receiver to recover a tracking signal, according to some implementations. In this implementation, the optical detector system 124 uses a Wollaston prism 1102 or other equivalent device as the polarization analyzer 198. The Wollaston prism 1102 accepts the first portion of light 754 as input and provides as output a first portion of light (first polarization) 1104 along a first angle relative to the Wollaston prism 1102 and a second portion of light (second polarization) 1106 along a second angle. The first polarization is orthogonal to the second polarization.

A first detector array 194(1) is arranged along the first angle, to accept the first portion of light (first polarization) 1104. A second detector array 194(2) is arranged along the second angle, to accept the first portion of light (second polarization) 1106.

In this implementation, the output signals 360 from the first detector array 194(1) and the second detector array 194(2) are used to determine the intensity data 764.

Figure 12:
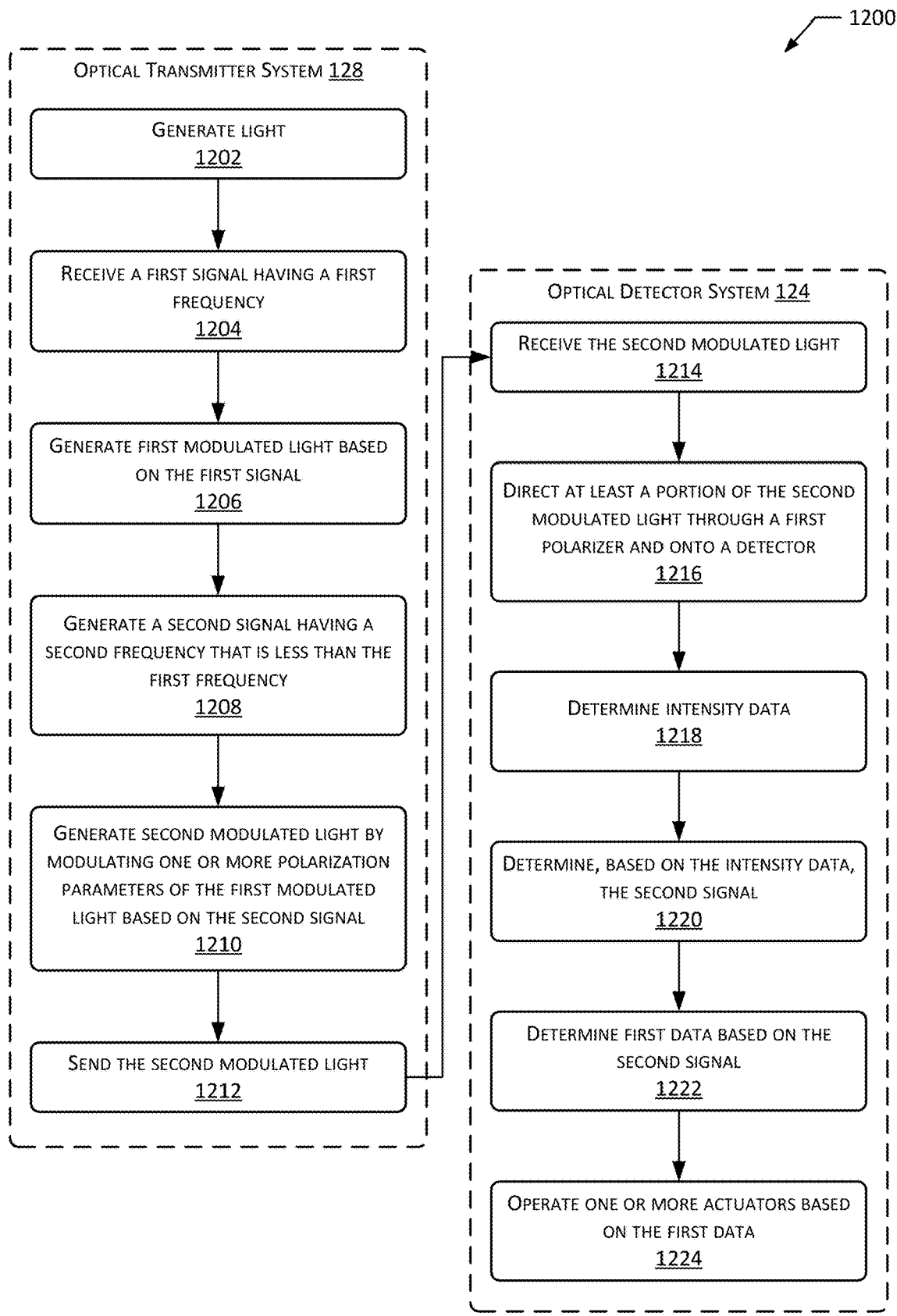
FIG. 12 is a flow diagram of a process to modulate one or more polarization parameters to convey a tracking signal and recovering and utilizing that tracking signal, according to some implementations.

FIG. 12 is a flow diagram 1200 of a process to modulate one or more polarization parameters to convey a tracking signal and to recover and utilize that tracking signal, according to some implementations. Portions of the process may be implemented by an optical transmitter system 128 and an optical detector system 124.

Operations 1202 through 1212 may be performed by a transmitting system, such as the optical transmitter system 128 of a first satellite 102(1). Operations 1214 through 1224 may be performed by a receiving system, such as the optical detector system 124 of a second satellite 102(2).

At 1202 light is generated. For example, the light source 702 generates continuous wave light 704.

At 1204 a first signal having a first frequency is received. For example, the first signal may comprise the data signal 722 from a payload of the first satellite 102(1).

At 1206 first modulated light 708 is generated based on the first signal. For example, the first modulator 706 may be operated based on the data signal 722.

At 1208 a second signal is generated. The second signal has a second frequency that is less than the first frequency. For example, the signal generator 712 may generate the tracking signal 714. Continuing the example, the tracking signal 714 may have a frequency of 20 kHz, while the data signal 722 has a frequency greater than 1 MHz.

At 1210 second modulated light 716 is generated by modulating one or more polarization parameters of the first modulated light 708 based on the second signal. For example, the second modulator 710 may be operated based on the tracking signal 714 and controlled by the modulation controller 720.

At 1212 the second modulated light 716 is sent to a receiving device. Before sending, the second modulated light 716 may be amplified. The now-amplified second modulated light 716 may be sent using a telescope 302(1) of the first satellite 102(1).

At 1214, the second modulated light 716 is received. For example, a second telescope 302(2) of the second satellite 102(2) may collect the incoming second modulated light 716.

At 1216 at least a portion of the second modulated light 716 is directed through a first polarizer and onto a detector. For example, the beamsplitter 332 may direct the first portion of light 754 through the polarization analyzer 198 and onto the detector array 194.

At 1218 the intensity data 764 is determined. For example, the output signals 360 may be processed to determine intensity data 764 indicative of intensity of the light impinging on one or more detectors in the detector array 194 at a given time.

At 1220 the second signal is determined based on the intensity data 764. For example, the intensity data 764 may be processed to recover the tracking signal 780.

The tracking signal 780 may be recovered using a variety of techniques. For example, a sinusoidal reference signal may be generated and synchronous lock-in detection may be used. The tracking signal 780 as recovered may include harmonics due to the polarization parameters being modulated. Performance of the system may be improved by utilizing synchronous lock-in detection in conjunction with a reference signal having a square waveform. The use of the square waveform allows collected energy to include the signal and those harmonics that are within a passband of the system.

At 1222 first data is determined based on the tracking signal 780. For example, with the tracking signal 780 recovered, the system may proceed to determine one or more of the direction data 364 or the distance data 366.

At 1224 one or more actuators may be operated based on the first data. For example, the actuators 306 may be operated to move the moveable mirror 304. Operation of the actuators 306 may serve to direct the incoming light 380 onto the optical receiver system 126 while the outgoing light 352 is directed toward the first satellite 102(1).

Other operations may also be performed. In one implementation, the optical detector system 124 may vary the polarization of the polarization analyzer 198 to maximize the difference in intensity between peaks and troughs of the first portion of light 754. For example, a first orientation of the first polarizer relative to the second modulated light 716 may be determined that produces a maximum difference in intensity as indicated by the intensity data 764 between a first portion of the recovered tracking signal 780 and a second portion of the recovered tracking signal 780. This adjustment of the polarization direction of the polarization analyzer 198 may be performed periodically, responsive to a change in peak amplitude over time, and so forth.

The circuitry, processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
a transmitting system comprising:
a laser that generates light;
a first modulator that modulates the light to produce first modulated light;
a first signal source that generates a first signal;
a second modulator that modulates polarization of the first modulated light using the first signal to produce second modulated light, wherein the second modulator comprises:
a first splitter to divide the first modulated light into horizontally polarized first modulated light and vertically polarized first modulated light;
a third modulator to modulate the horizontally polarized first modulated light responsive to the first signal to produce horizontally polarized second modulated light;
a fourth modulator to modulate the vertically polarized first modulated light responsive to the first signal to produce vertically polarized second modulated light; and
a combiner that receives the horizontally polarized second modulated light and the vertically polarized second modulated light and outputs the second modulated light;
a first amplifier that amplifies the second modulated light to produce amplified light; and
one or more optical elements that direct the amplified light.

2. The system of claim 1, wherein the second modulator modulates one or more of polarization rotation or polarization ellipticity;
The transmitting system further comprising electronics that determine polarization parameters based on a first set of constraint values, wherein the polarization parameters are indicative of the one or more of polarization rotation or polarization ellipticity; and
wherein the second modulator modulates the first modulated light based on the polarization parameters.

3. The system of claim 1 further comprising:
a receiving system comprising:
a telescope to receive the amplified light;
a beamsplitter to direct:
a first portion of the amplified light along a first path; and
a second portion of the amplified light along a second path; and
the first path comprising:
a polarizer having a first polarization; and
a detector array that generates an output signal indicative of a change in intensity of the first portion of the amplified light that is incident upon the detector array, wherein the output signal is indicative of the first signal.

4. The system of claim 3, wherein the detector array comprises a plurality of photodetectors; and
the receiving system further comprising:
a mirror;
one or more actuators, wherein the one or more actuators operate to move the mirror; and
electronics to:
determine a second signal is represented in the output signal;
determine, based on the second signal being represented in the output signal, first data; and
operate the one or more actuators based on the first data.

5. The system of claim 1, wherein the first modulator modulates the light responsive to a second signal representative of data, and wherein the second signal has a frequency that is greater than the first signal.

6. The system of claim 1, wherein the second modulated light exhibits a modulation index of at least 0.70.

7. The system of claim 1, wherein the second modulator comprises an electro-optical device to modify one or more of polarization ellipticity or polarization rotation of the first modulated light to produce the second modulated light.

8. The system of claim 1, further comprising:
a first fiber to convey the first modulated light to the first splitter, wherein the first fiber maintains a polarization of light; and
a second fiber to convey the second modulated light from the combiner to the first amplifier, wherein the second fiber maintains a polarization of light.

9. The system of claim 1, wherein the second modulator modulates polarization rotation and polarization ellipticity of the first modulated light.

10. A system comprising:
a receiving system comprising:
a first telescope that receives first light, wherein polarization of the first light is modulated based on a first signal;
one or more optical components that direct a first portion of the first light through a polarization analyzer and onto a detector array; and
first electronics that:
operate the polarization analyzer to provide a first polarization orientation at a first time and a second time;
determine a first intensity of the first portion of the first light that is incident on the detector array at the first time;
determine a second intensity of the first portion of the first light that is incident on the detector array at the second time;
determine a first variance between the first intensity and the second intensity;
operate the polarization analyzer to provide a second polarization orientation at a third time and a fourth time;
determine a third intensity of the first portion of the first light that is incident on the detector array at the third time;
determine a fourth intensity of the first portion of the first light that is incident on the detector array at the fourth time;
determine a second variance between the third intensity and the fourth intensity;
responsive to the first variance being greater than the second variance, operate the polarization analyzer to provide the first polarization orientation at a fifth time;
determine intensity data indicative of intensity of the first portion of the first light incident on the detector array, wherein the intensity data is acquired at or after the fifth time; and determine, based on the intensity data, that the first signal is present in the first portion of the first light.

11. The system of claim 10, wherein the polarization analyzer converts polarization modulation of the first portion of the first light to amplitude modulation of the first portion of the first light incident on the detector array, wherein the amplitude modulation of the first portion of the first light that corresponds to the first signal exhibits a modulation index of at least 50%.

12. The system of claim 10, the receiving system further comprising:
a mirror;
one or more actuators, wherein the one or more actuators move the mirror; and
second electronics that operate the one or more actuators based on the intensity data.

13. The system of claim 10, further comprising:
a transmitting system comprising:
a light source that generates light;
a first modulator that modulates polarization of the light from the light source to produce the first light, responsive to the first signal; and
one or more optical components that direct the first light toward the receiving system.

14. The system of claim 10, further comprising:
a transmitting system comprising:
a light source that generates light; and
a first modulator that modulates state of polarization (SOP) of the light to produce the first light, responsive to the first signal, wherein the SOP is dithered with respect to time to provide a specified modulation index.

15. The system of claim 10, wherein:
the first signal has a first frequency; and
the first electronics of the receiving system:
determine, based on the intensity data, a second signal;
generate a reference signal having a square waveform, wherein the reference signal has the first frequency; and
determine, based on the second signal and the reference signal, the first signal in the intensity data.

16. The system of claim 10, wherein the one or more optical components comprise a beamsplitter that directs the first portion of the first light through the polarization analyzer and onto the detector array and a second portion of the first light to an optical receiver system.

17. A method comprising:
generating, at a first device, light;
receiving, at the first device, a first signal having a first frequency;
generating, at the first device and using the light, first modulated light based on the first signal;
generating, at the first device, a second signal having a second frequency, wherein the second frequency is less than the first frequency;
generating, at the first device, second modulated light by modulating one or more polarization parameters of the first modulated light based on the second signal;
sending, from the first device to a second device, the second modulated light;
determining, at the second device, intensity data that is indicative of intensity of at least a portion of the second modulated light that is incident upon a detector;
determining, at the second device, a third signal based on the intensity data;
generating, at the second device, a reference signal; and
determining, at the second device, the second signal in the intensity data based on the third signal and the reference signal.

18. The method of claim 17, further comprising:
at the second device, directing the at least a portion of the second modulated light through a first polarizer and onto the detector.

19. The method of claim 18, further comprising:
determining, at the second device, a first orientation of the first polarizer relative to the second modulated light, wherein the first orientation produces a maximum difference in intensity as indicated by the intensity data between a first portion of the second signal and a second portion of the second signal.

20. The method of claim 17, wherein the polarization parameters are one or more of:
polarization rotation, or
polarization ellipticity.

* * * * *